(12) United States Patent
Kubo et al.

(10) Patent No.: US 7,106,249 B2
(45) Date of Patent: Sep. 12, 2006

(54) PHASE CALIBRATION METHOD AND APPARATUS

(75) Inventors: Tokuro Kubo, Kawasaki (JP); Kazuo Nagatani, Kawasaki (JP); Hajime Hamada, Kawasaki (JP); Hiroyoshi Ishikawa, Kawasaki (JP); Nobukazu Fudaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 45 days.

(21) Appl. No.: 10/920,994

(22) Filed: Aug. 18, 2004

(65) Prior Publication Data

US 2005/0219118 A1    Oct. 6, 2005

(30) Foreign Application Priority Data

Mar. 30, 2004   (JP) ............................. 2004-099260

(51) Int. Cl.
  *G01S 7/40* (2006.01)
  *H01Q 3/26* (2006.01)

(52) U.S. Cl. ...................... 342/174; 342/165; 342/173; 342/175; 342/195; 342/368; 702/85; 702/106; 702/107

(58) Field of Classification Search ........ 342/165–175, 342/195, 368–384; 375/224–236; 455/561; 702/85, 89, 104, 106, 107
See application file for complete search history.

(56) References Cited

U.S. PATENT DOCUMENTS

| 6,157,343 | A  | * | 12/2000 | Andersson et al. | ......... | 342/371 |
| 6,339,399 | B1 | * | 1/2002  | Andersson et al. | ......... | 342/372 |
| 6,747,595 | B1 | * | 6/2004  | Hirabe           | ......... | 342/174 |
| 6,762,717 | B1 | * | 7/2004  | Hirabe           | ......... | 342/368 |
| 6,806,844 | B1 | * | 10/2004 | Azuma            | ......... | 455/561 |
| 2003/0058166 | A1 | * | 3/2003 | Hirabe | ......... | 342/368 |
| 2003/0142012 | A1 | * | 7/2003 | Hirabe | ......... | 342/173 |
| 2003/0236107 | A1 | * | 12/2003 | Azuma | ......... | 455/561 |
| 2004/0070533 | A1 | * | 4/2004 | Azuma | ......... | 342/174 |

FOREIGN PATENT DOCUMENTS

| EP | 0 812 027 | 12/1997 |
| EP | 1 014 485 | 6/2000 |
| EP | 1 093 186 | 4/2001 |
| EP | 1178562 A1 * | 2/2002 |
| EP | 1 227 542 | 7/2002 |
| EP | 1329983 A2 * | 7/2003 |

(Continued)

OTHER PUBLICATIONS

European Search Report Dated Jan. 2, 2006.

*Primary Examiner*—Bernarr E. Gregory
(74) *Attorney, Agent, or Firm*—Katten Muchin Rosenman LLP

(57) ABSTRACT

Disclosed is a phase calibration method for inserting a calibration signal (SC) into main signals (SM1 to SMn) of a plurality of branches in turn, estimating the phase characteristic of an analog circuit to which a respective one of the main signals is input and calibrating the phase of each main signal. The method includes steps of outputting a first combined signal obtained by combining output signals from the analog circuits (62a to 62n) in all branches, outputting a second combined signal obtained by combining the main signals in all branches, extracting the calibration signal by removing the second combined signal from the first combined signal in a calibration signal extracting unit (64), estimating the phase characteristics of the analog circuits, to which the main signals having the inserted calibration signal are input, based upon a change in phase of the calibration signal, and subjecting the main signals to phase adjustment having characteristics that are opposite the phase characteristics.

23 Claims, 24 Drawing Sheets

FOREIGN PATENT DOCUMENTS

| | | | |
|---|---|---|---|
| EP | 1389837 A1 * | 2/2004 |
| EP | 1515455 A1 * | 3/2005 |
| JP | 2002-261668 | 9/2002 |
| JP | 2003-143047 | 5/2003 |

* cited by examiner

FIG. 8
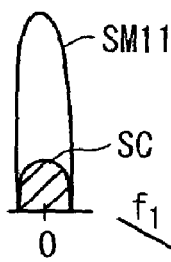
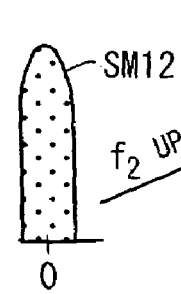
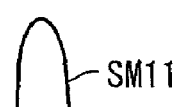
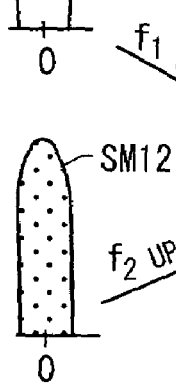
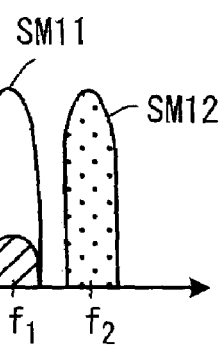
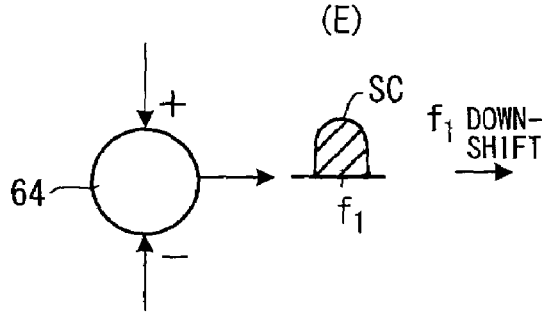
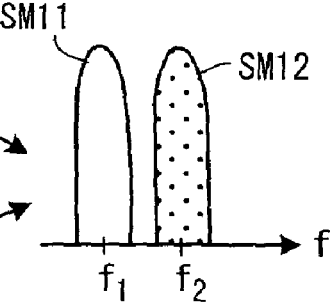

PHASE CALIBRATION METHOD AND APPARATUS

BACKGROUND OF THE INVENTION

This invention relates to a phase calibration method and apparatus. More particularly, the invention relates to a phase calibration method and apparatus for inserting a calibration signal into a main signal, inputting the resultant signal to a prescribed circuit and calibrating the phase of the main signal based upon a change in the phase of the calibration signal contained in the output signal of the circuit.

In an adaptive array antenna system known in the art, a base station or a mobile station in a communication system is provided with a plurality of antennas and transmitters and the phases and amplitudes of the ratio waves produced by each of the antennas are controlled independently to form a transmit beam pattern in such a manner that the peak of the pattern will point in a prescribed direction.

FIG. 17 is a diagram illustrating the configuration of a base-station adaptive array antenna system. A direction estimating unit 1 receives a signal that has been transmitted from a mobile station and estimates the direction in which the mobile station lies. A transmit beam former 2 controls the phases and amplitudes of radio waves that are output from antenna elements A#1 to A#n of an array antenna 3, thereby forming a transmit beam pattern in such a manner that the peak of the pattern will point in the direction of the mobile station. The transmit beam former 2 includes a weight controller 2a for outputting amplitude and phase adjustment values $\omega_i$, $\phi_i$ of the antenna elements A#1 to A#n in such a manner that the peak will point in the direction of the mobile station, and amplitude and phase adjusting units $2b_1$ to $2b_n$ for adjusting the transmit-signal amplitudes and phases, which are input to the antenna elements A#1 to A#n, by $\omega_i$, $\phi_i$. DA converters 4a to 4n convert signals, which are output from the amplitude and phase adjusting units $2b_1$ to $2b_n$, to analog signals. Analog circuits 5a to 5n each have a mixer 6a, local oscillator 6b, filter 6c and high-frequency amplifier 6d. The mixers 6a of the analog circuits 5a to 5n multiply the transmit signals that are output from the DA converters 4a to 4n by the outputs of the local oscillators and up-convert the signal frequencies from baseband to high frequency. The filters 6c pass desired band components, and the frequency amplifiers 6d subject the filter outputs to high-frequency amplification and apply the amplified signals to the corresponding antenna elements A#1 to A#n. In accordance with the adaptive array antenna system of FIG. 17, the transmit beam pattern can be formed in such a manner that the peak points in the direction of the mobile station.

A problem which arises in the adaptive array antenna system of FIG. 17 is a deviation in each branch ascribable to variations in the amplitude and phase of the analog component parts. This is illustrated in FIG. 18. In a case where it is assumed that the weighting coefficients in weighting control have the same values for all branches, the phases after weighting control will all be identical in the digital section. However, when the signals reach the antennas through the analog circuits 5a to 5n after the digital-to-analog conversion, the phases in each of the branches will exhibit a deviation from one branch to the next. Fabricating the analog circuits 5a to 5n so as to eliminate such deviation is not impossible but is impractical. It is believed difficult to fabricate the analog circuits so as to eliminate fluctuations in manufacturing cost and temperature characteristics and fluctuations ascribable to aging. What is required, therefore, is a phase calibrator. FIG. 19 is a diagram illustrating the configuration of an adaptive array antenna system having a phase calibrator. Specifically, a phase calibrator 7 is provided on the output side of the transmit beam former 2 that performs weighting control. The phase calibrator 7 has phase adjusters $7a_1$ to $7a_n$ for adjusting transmit-signal phase input to the antenna elements, and a phase controller 7b for generating phase adjustment values. The phase calibrator 7 corrects for the phase changes in the analog circuits 5a to 5n. That is, the phase calibrator 7 exercises control so as to apply a phase correction having characteristics opposite the phase characteristics of the analog circuits 5a to 5n, as a result of which the phases will agree at the array antenna 3.

In order to perform the calibration shown in FIG. 19, it is necessary to observe the signals that have passed through the analog circuits 5a to 5n and measure the phase characteristics (phase lead/lag characteristics) of the analog circuits. Adaptive array antenna systems each having a structure for this purpose are illustrated in FIGS. 20 and 21.

In order to calibrate phase, it is necessary to insert a calibration signal into the transmit signals of each of the branches in turn, input the resultant signals to the analog circuits 5a to 5n and measure a change in the phase of the calibration signal contained in the output signal of each analog circuit. There are two methods of doing this. According to one method, as shown in FIG. 20, signals extracted from the outputs of the analog circuits 5a to 5n of respective ones of the branches are selected one at a time by a switch 8, subjected to an analog-to-digital conversion by an AD converter 9 and fed back to the phase calibrator 7. According to the other method, as shown in FIG. 21, the outputs of the analog circuits 5a to 5n are combined by a combiner 10, after which the combined signal is converted to a digital signal by the AD converter 9 and fed back to the phase calibrator 7.

In FIGS. 20 and 21, the phase calibrator 7 includes the phase adjusters $7a_1$, to $7a_n$ for adjusting the transmit-signal phases of each of the branches; the phase controller 7b for generating the phase adjustment values, which are for applying a phase correction having characteristics opposite the phase characteristics of the analog circuits 5a to 5n, and inputting the corrected signals to the phase adjusters $7a_1$ to $7a_n$; a calibration signal generator 7c for generating a calibration signal; adders $7d_1$, to $7d_n$ for inserting the calibration signal into the transmit signals of respective ones of the branches; a phase estimation unit 7e for estimating the phase characteristics of each of the analog circuits 5a to 5n using the calibration signal that has been fed back; and a calibration controller 7f for controlling the overall phase calibrator.

FIG. 22 is a diagram useful in describing the timing at which the calibration signal is inserted into the transmit signals on each of the branches. A calibration signal SC is not inserted into transmit signals SM1 to SMn of the respective branches simultaneously but at different times. That is, the phase of a branch into which the calibration signal SC has been inserted is estimated, a phase adjustment is performed based upon the result and then this is repeated for each branch. In FIG. 22, the branches undergo the phase adjustment one after another in regular order. However, no problems arise even with an arrangement in which the phase adjustment is carried out collectively after the phases of all branches have been estimated.

With the scheme of FIG. 20 that employs switching, only a transmit signal SMi of a branch into which the calibration signal SC has been inserted, as well as this calibration signal SC, is fed back to the phase estimation unit 7e. With the scheme of FIG. 21 that employs combining, however, the transmit signals (SM1+SM2+ . . . SMn) on all branches and the calibration signals SC are fed back to the phase estimation unit 7e, as illustrated in FIG. 23.

FIG. 24 shows the details of the combining scheme. Here the calibration signal SC is spread by a spreading code in a spreader 7g and the spread signal is inserted in turn into transmit signals SMi of branches selected by a selector 7h. Further, a demodulated signal is despread in a despreader 11, the calibration signal is extracted and is input to the phase estimation unit 7e. Each of the analog circuits 5a to 5c is composed of a modulator MD and high-frequency amplifier HFA. Portions of the outputs of the analog circuits are extracted using directional couplers 12a to 12c, the extracted signals are input to the combiner 10, which has a hybrid construction, the combined signal from the combiner 10 is demodulated to a baseband signal by a demodulator 13 and the demodulated signal is input to the spreader 11 after undergoing an analog-to-digital conversion.

An adaptive array antenna system that performs calibration without halting system operation is known in addition to the prior art described above (see the specification of JP 2003-143047A). The latter prior-art system transmits a reference signal Y, extracts a signal component that is correlated with the reference signal from a receive signal and corrects transmission weighting coefficients based upon this signal component.

In the arrangement shown in FIG. 20, the branch signal fed back is selected by the switch 8. Insofar as calibration is performed, phase can be estimated by inputting only the transmit signal of a certain selected branch and the calibration signal that was inserted into this transmit signal to the phase estimation unit 7e. However, there is the possibility that phase deviations between ports (P1Q, P2Q, P3Q, . . . ) of the switch 8 will lead to calibration error. In particular, phase calibration requires that phase deviation be adjusted to a precision of several degrees or less. With the switching arrangement of FIG. 20, however, there are instances where the phase deviation between ports becomes tens of degrees, which is not desirable. Further, an undesirable property of the switch is that its phase characteristic fluctuates owing to environmental conditions such as temperature.

With the arrangement of FIG. 21 in which use is made of a signal obtained by combining the signals of each of the branches in the combiner 10, the problem of phase deviation is eliminated and calibration error can be suppressed. Specifically, a phase deviation between ports can lead to calibration error even when the combiner 10 is used. However, since the combiner 10 employs a hybrid of a microstrip line, for example, there are no mechanical and semiconductor portions and phase deviation is small in comparison with an active element such as a switch. Further, since the combiner (hybrid) 10 is a passive element, it can be considered highly reliable with regard to malfunction.

With the arrangement based upon the combiner 10 in FIG. 21, however, all transmit signals on all branches are combined and fed back. Consequently, in the ratio of the inserted calibration signal SC to the other transmit signals (SM1+ SM2+ . . . SMn), as shown in FIG. 23, the calibration signal is small, the calibration signal, which is at the crux of phase estimation, has a poor S/N ratio and hence there is the likelihood of a decline in phase adjustment accuracy. More specifically, the larger the value given by the following equation, the greater the improvement in calibration:

(calibration signal)/(transmit signal)=$SC/(SM1+SM2+ \ldots SMn)$

With the arrangement of FIG. 21, however, this value is small and a decline in phase estimation accuracy results.

With the scheme shown in FIG. 24, a calibration signal can be extracted by despreading. However, the transmit signal still remains as noise. In order to implement highly precise calibration of within a few degrees, it is necessary to lengthen the time for integrating the results of despreading, thereby improving calibration-signal extraction precision and raising calibration precision, as shown in FIG. 25. However, the problem is that estimation requires a long period of time. Furthermore, in addition to the long period of time needed to integrate the results of despreading, there is an increase in the scale of the circuitry owing to an increase in the number of bits of the integrator. It should be noted that if the noise level is low, the desired calibration precision can be obtained in a short period of time, as indicated by the solid line in FIG. 25.

Further, with the prior art illustrated in the specification of JP 2003-143047A, the implementation for correcting the transmit weighting coefficients branch by branch is complicated. In this example of the prior art, problems similar to those encountered with the switching and combining schemes of FIGS. 20 and 21 arise in a case where shared use is made of weighting coefficient/correction units.

SUMMARY OF THE INVENTION

Accordingly, an object of the present invention is to perform calibration of all branches in shared fashion, reduce phase deviation between branches, improve phase estimation precision and raise calibration precision.

In accordance with the present invention, the foregoing object is attained by providing a phase calibration method for inserting a calibration signal into a main signal, inputting the resultant signal to a prescribed circuit and calibrating phase of the main signal using the calibration signal contained in an output signal from the circuit, comprising the steps of: extracting the calibration signal by subtracting the main signal from the output signal of the circuit; estimating the phase characteristic of the circuit based upon a change in phase of the calibration signal; and subjecting the main signal to a phase adjustment having a characteristic that is opposite the phase characteristic.

Further, in accordance with the present invention, the foregoing object is attained by providing a phase calibration method for inserting a calibration signal into main signals in a plurality of branches in turn, estimating a phase characteristic of a circuit to which a respective one of the main signals is input and calibrating phase of each main signal, comprising the steps of: outputting a first combined signal obtained by combining output signals from the circuit in all branches, and outputting a second combined signal obtained by combining the main signals in all branches; extracting the calibration signal by removing the second combined signal from the first combined signal; estimating phase characteristics of the circuits, to which the main signals having the inserted calibration signal are input, based upon a change in phase of the calibration signal; and subjecting the main signals to phase adjustment having characteristics that are opposite the phase characteristics.

In order to insert and extract a calibration signal, the calibration signal is spread by a spreading code, the spread signal is inserted into a prescribed main signal, a signal obtained by removing the second combined signal from the first combined signal is despread by the despreading code and the calibration signal is extracted.

In accordance with the present invention, the foregoing object is attained by providing a phase calibration apparatus for inserting a calibration signal into main signals in a plurality of branches in turn, estimating a phase characteristic of a circuit to which each main signal is input and calibrating phase of each main signal, comprising: a calibration-signal inserting unit for inserting a calibration signal into main signals in a plurality of branches in turn; a first combining circuit for outputting a first combined signal by combining output signals from the circuit in all branches; a second combining circuit for outputting a second combined signal by combining the main signals in all branches; a calibration signal extracting unit for extracting the calibration signal by removing the second combined signal from the first combined signal; and a phase adjusting unit for estimating phase characteristics of the circuits, to which the main signals having the inserted calibration signal are input, based upon a change in phase of the calibration signal, and subjecting the main signals to phase adjustment having characteristics that are opposite the phase characteristics.

Means for inserting and extracting a calibration signal includes: a spreader for spreading the calibration signal by a spreading code; an inserting unit for inserting the spread signal into a prescribed main signal; and a despreader for despreading a signal, which is obtained by removing the second combined signal from the first combined signal, by the spreading code, and extracting the calibration signal.

In accordance with the present invention, precision with which a calibration signal is extracted can be improved by removing the main signal and calibration can be performed in a short period of time. Further, according to the present invention, phase estimation precision is improved and calibration precision can be raised.

Further, in accordance with the present invention, calibration of the branches can be performed in common. Moreover, the calibration signal on each branch can be extracted precisely and calibration performed in a short period of time. Further, according to the present invention, phase deviation between branches can be reduced, phase estimation precision improved and calibration precision raised.

Further, in accordance with the present invention, a calibration signal is spread and inserted into a main signal, and a calibration signal can be extracted by despreading. This makes it possible to improve calibration-signal extraction precision.

Other features and advantages of the present invention will be apparent from the following description taken in conjunction with the accompanying drawings.

BRIEF DESCRIPTION OF THE DRAWINGS

FIG. 8 is a diagram useful in describing the operation of FIG. 7;

DESCRIPTION OF THE PREFERRED EMBODIMENTS (A) Overview of the Present Invention

Figure 1:
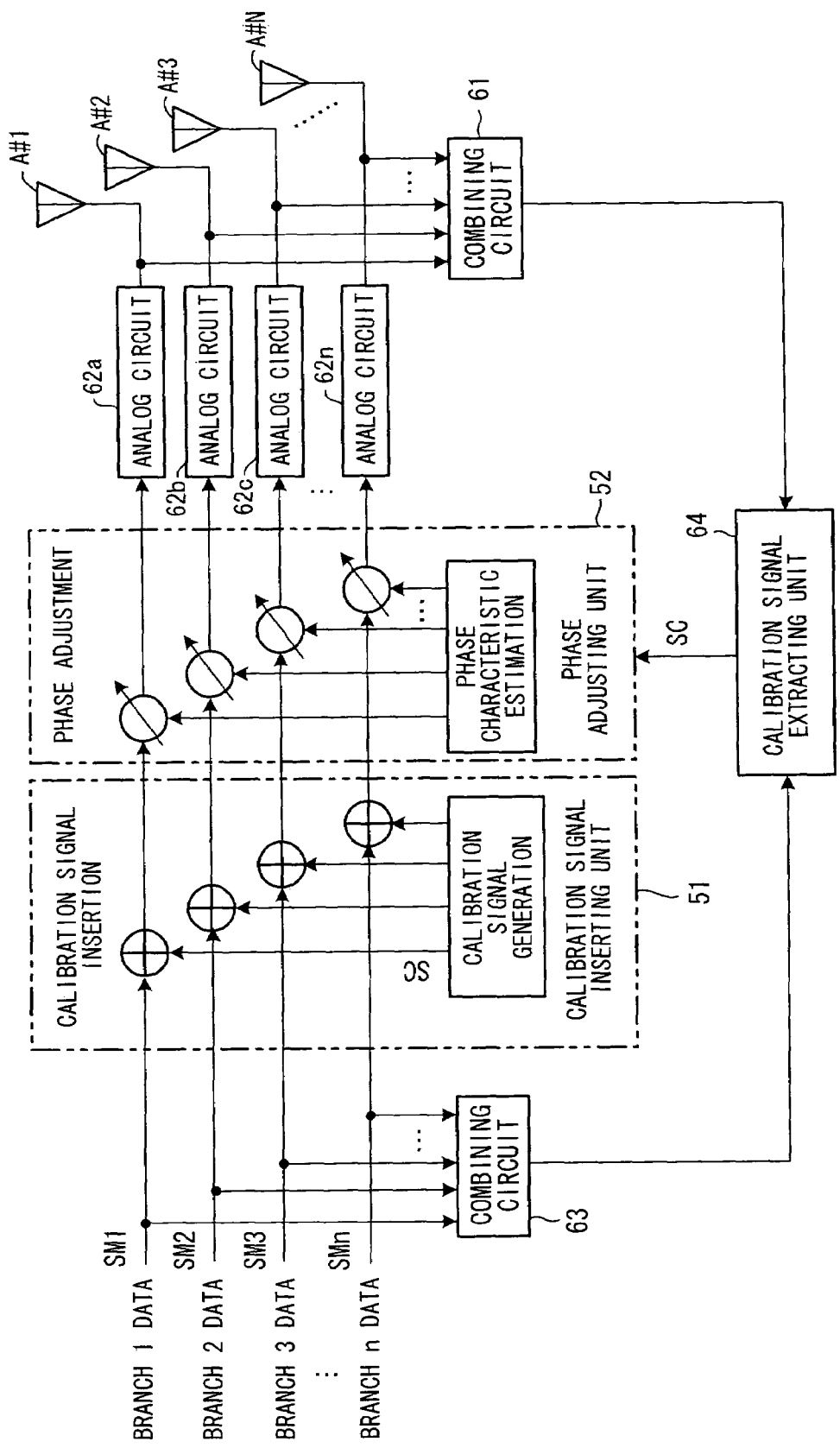
FIG. 1 is a diagram illustrating the principle of the present invention.

FIG. 1 is a diagram illustrating the principle of the present invention. Specifically, FIG. 1 illustrates the overall structure of a phase calibration apparatus for inserting a calibration signal SC into the transmit signals (also referred to as "main signals") SM1 to SMn of a plurality of branches 1 to n one after another in turn, estimating the phase characteristics of analog circuits to which respective ones of these main signals are input and calibrating the phase of each main signal. The phase calibration apparatus includes a calibration signal inserting unit 51 for inserting the calibration signal SC into the main signals SM1 to SMn of the plurality of branches 1 to n in turn; a first combining circuit 61 for outputting a first combined signal by combining output signals from analog circuits 62a to 62n of all branches; a second combining circuit 63 for outputting a second combined signal by combining the main signals SM1 to SMn of all branches; a calibration signal extracting unit 64 for extracting the calibration signal SC by removing the second combined signal from the first combined signal and inputting the extracted calibration signal SC to phase adjusting unit 52; and the phase adjusting unit 52 for estimating the phase characteristics of the analog circuits 62a to 62n, to which the main signals having the inserted calibration signal are input, based upon a change in the phase of the calibration signal SC applied thereto, and subjecting the main signals to a phase adjustment exhibiting characteristics that are the opposite of the phase characteristics.

Figure 2:
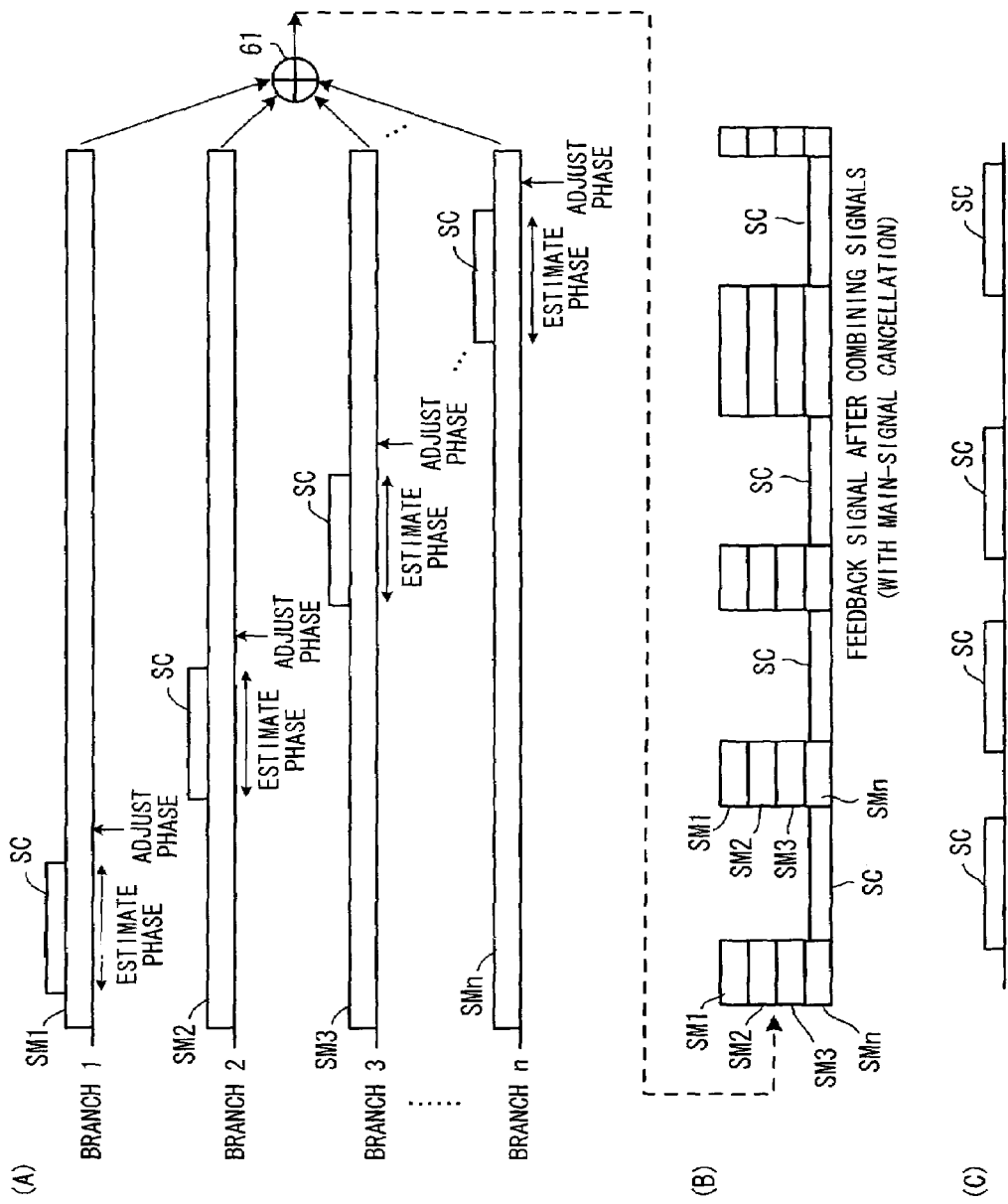
FIG. 2 is a diagram useful in describing calibration-signal insertion timing and results of calibration-signal extraction.
Figure 23:
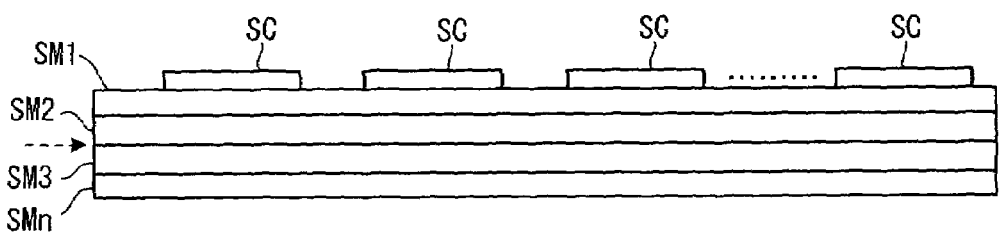
FIG. 23 is a diagram useful in describing a feedback signal in the combining scheme.
Figure 24:
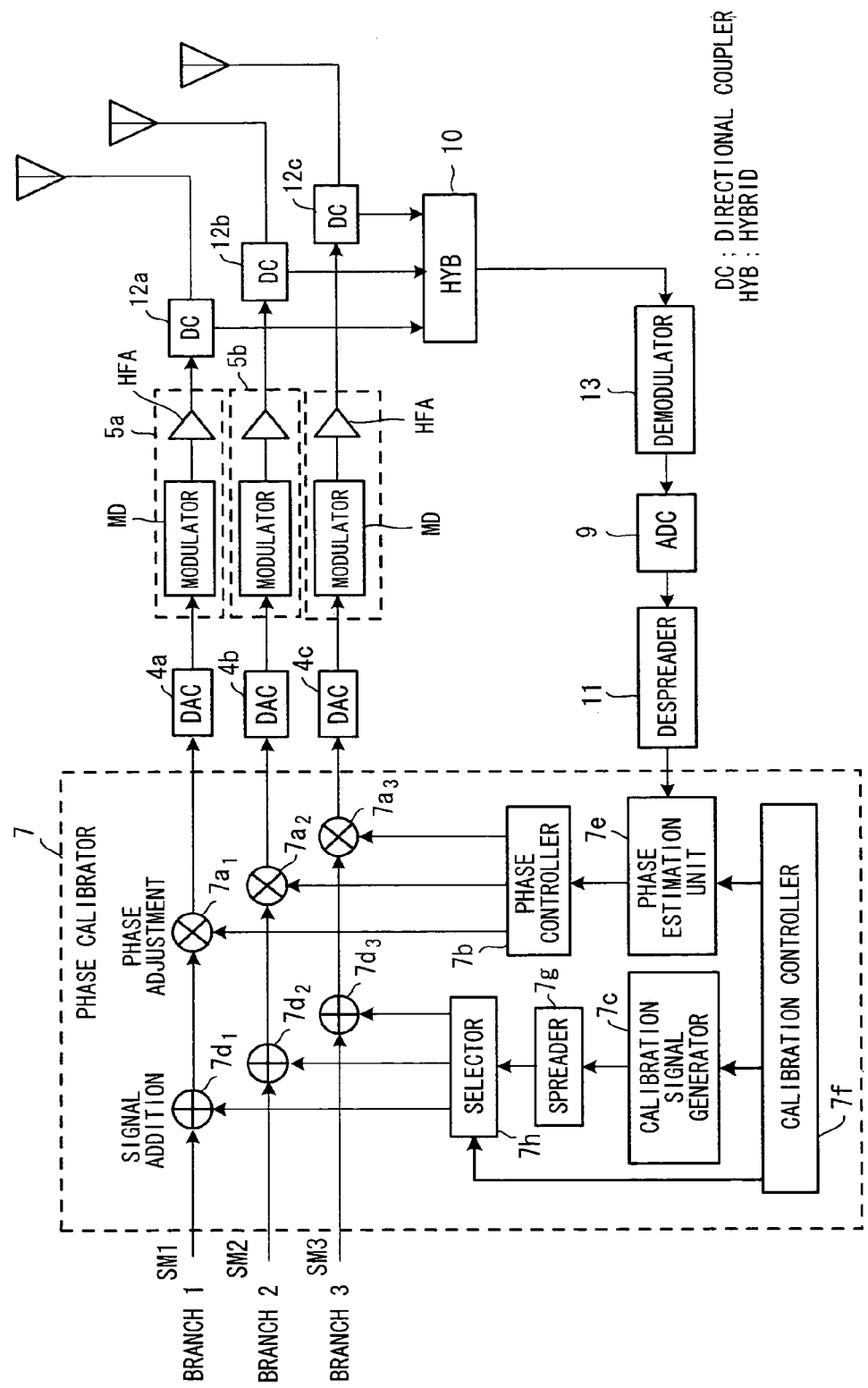
FIG. 24 illustrates a specific example of an adaptive array antenna system in the combining scheme.
Figure 25:
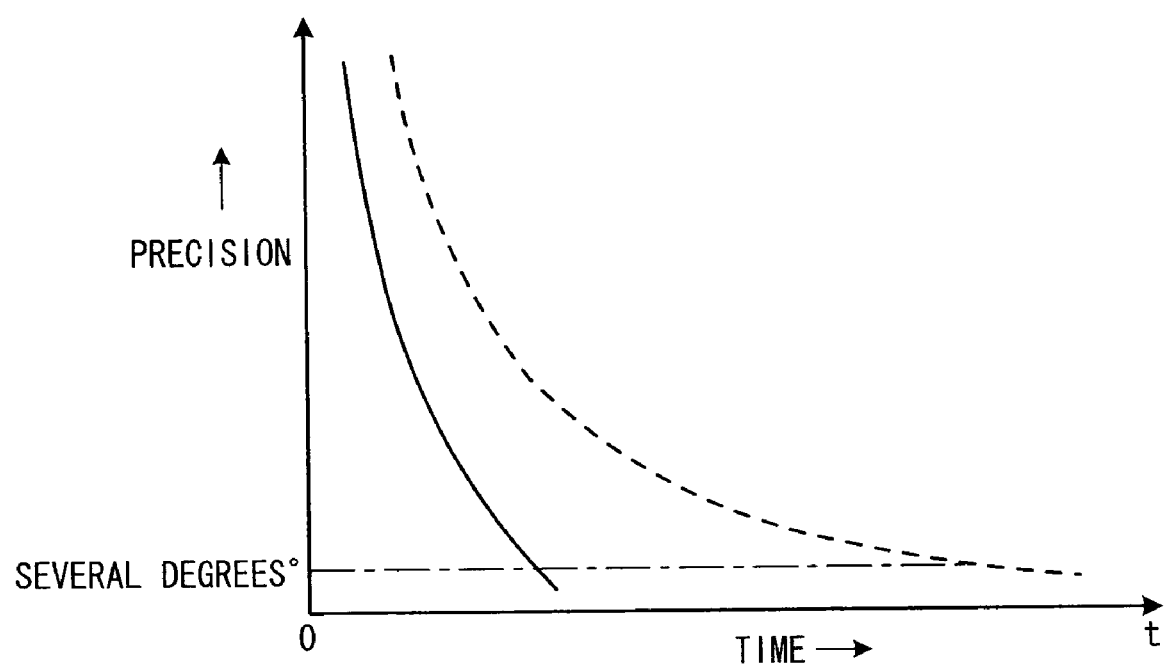
FIG. 25 is a diagram illustrating the relationship between calibration precision and calibration time.

As shown at (A) in FIG. 2, the calibration signal inserting unit 51 does not insert the calibration signal SC into the main signals SM1 to SMn of the branches 1 to n simultaneously but in turn at different times. That is, the phase of a branch into which the calibration signal SC has been inserted is estimated, a phase adjustment is performed based upon the result and then this is repeated in turn for each of the branches 1 to n. When a phase adjustment of one branch is performed, the first combining circuit 61 combines the output signals of the analog circuits 62a to 62n of all branches and outputs the first combined signal (SM1+ SM2+ . . . SMn+SC), the second combining circuit 63 outputs the second combined signal (SM1+SM2+ . . . SMn) and the calibration signal extracting unit 64 removes the second combined signal from the first combined signal and outputs the calibration signal SC. The signal waveform in a case where the main signals have been removed in ideal fashion in the calibration signal extracting unit 64 is illustrated at (B) in FIG. 2 in terms of power. FIG. 23 is the result when the main signals are not cancelled out. If the main signals are removed ideally, then the main signals will vanish while the calibration signal is being inserted and therefore only the calibration signal will be used in estimating phase. Accordingly, the S/N ratio of the calibration signal improves and it is possible to perform the phase estimation accurately. If the main signals are not removed (FIG. 23), the main signals also will be present during the introduction of the calibration signal and will constitute interference signals when phase estimation is performed using the calibration signal. The S/N ratio of the calibration signal is degraded and, as a result, this causes an increase in phase estimation error.

In FIG. 2, (B) represents a case where the main signals have been cancelled only when the calibration signal is inserted. It is possible, however, to arrange it so that the main signals are cancelled out at all times. In such case, the output signal waveform of the calibration signal extracting unit 64 would appear as illustrated at (C) in FIG. 2.

(B) First Embodiment

Figure 3:
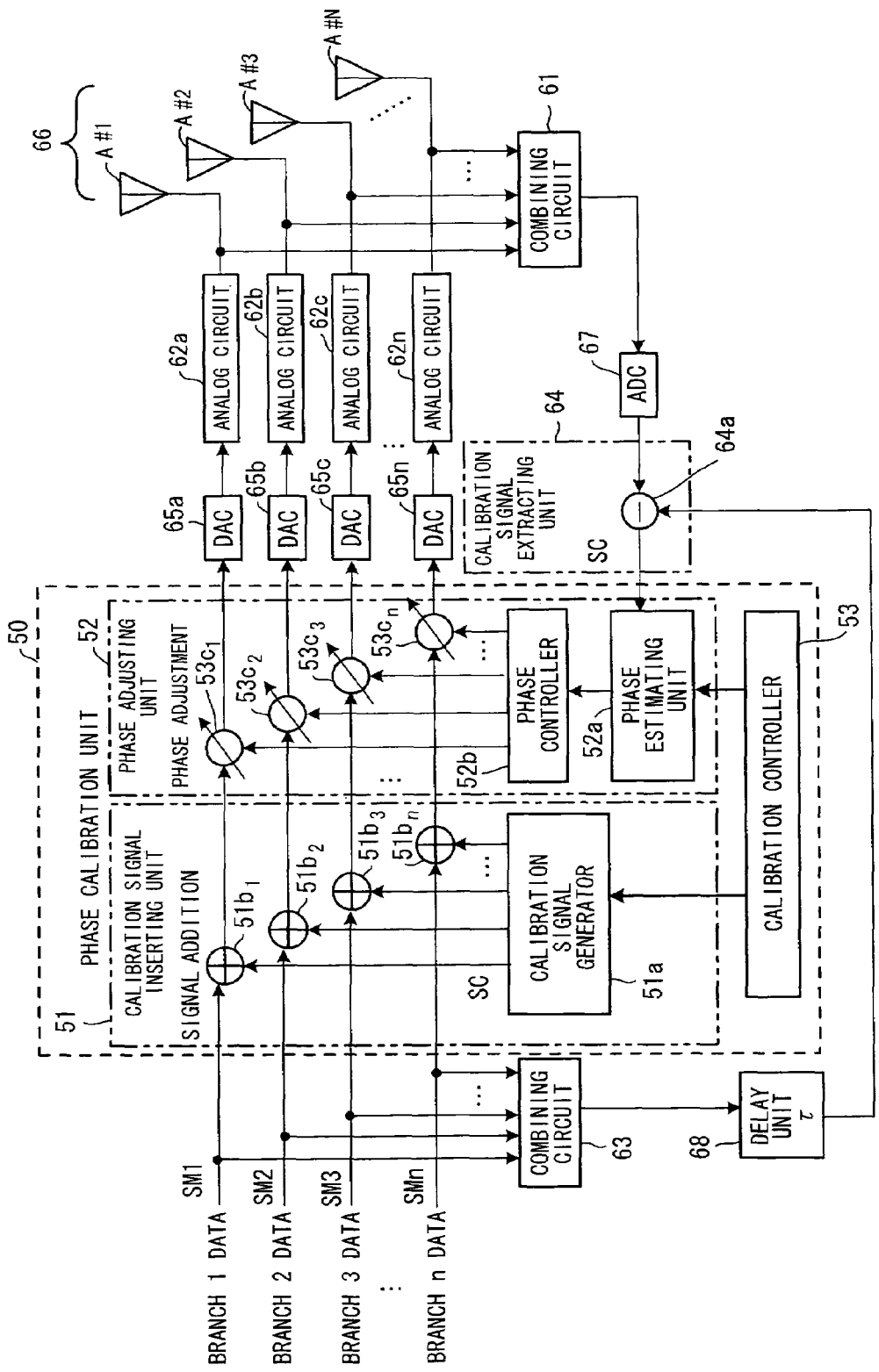
FIG. 3 is a basic structural view of phase calibration in an adaptive array antenna system according to the present invention.

FIG. 3 is a basic structural view of phase calibration in an adaptive array antenna system according to the present invention. Components in FIG. 3 identical with those shown in FIG. 1 are designated by like reference characters. A phase calibration unit 50 includes the calibration signal inserting unit 51 for generating the calibration signal and inserting it into a prescribed branch; the phase adjusting unit 52 for subjecting this branch to a phase adjustment having a characteristic that is opposite the phase characteristic of the analog circuit of the branch; and the calibration controller 53 for controlling the beginning and end of calibration and the branch to be calibrated.

The main signals SM1 to SMn of the branches 1 to n that are output from a transmit beam former (not shown) are input to the calibration signal inserting unit 51 of the phase calibration unit 50, which is implemented by digital components. The calibration signal inserting unit 51, which has a calibration signal generator 51a and adders $51b_1$ to $51b_n$ for inserting the calibration signal into the main signals SM1 to SMn of the respective branches, inserts the calibration signal into the main signals SM1 to SMn in turn per each of the branches 1 to n and then outputs the resultant signal.

The main signals SM1 to SMn and the calibration signal SC that has been inserted into the prescribed branches are input to DA converters 65a to 65n via the phase adjusting unit 52, and the DA converters convert these signals to analog signals and input the analog signals to analog circuits 62a to 62n. The latter up-convert the frequencies of the main signals from baseband to high frequency, pass the desired band components, apply high-frequency amplification and input the resultant signals to the corresponding antenna elements A#1 to A#n of the adaptive array antenna.

The first combining circuit 61 combines the output signals of the analog circuits 62a to 62n of all branches 1 to n, and an AD converter 67 converts the combined signal to a digital signal and inputs the digital signal to a subtractor 64a in the calibration signal extracting unit 64. The second combining circuit 63 combines the main signals SM1 to SMn of all branches 1 to n, and a delay unit 68 delays this combined signal by a prescribed length of time before inputting it to the subtractor 64a of the calibration signal extracting unit 64. The delay unit 68 has a delay time τ, which is the time it takes for the main signals SM1 to SMn to reach the calibration signal extracting unit 64 via the phase calibration unit 50 and analog circuits 62a to 62n.

The calibration signal extracting unit 64 subtracts the combined signal, which is output from the second combining circuit 63, from the combined signal that is output from first combining circuit 61, thereby extracting the calibration signal SC, and inputs the calibration signal SC to the phase adjusting unit 52 of the phase calibration unit 50.

When a phase adjustment of one branch is performed, the first combining circuit 61 combines the output signals of the analog circuits 62a to 62n of all branches and outputs the first combined signal (SM1+SM2+ . . . SMn+SC), the second combining circuit 63 outputs the second combined signal (SM1+SM2+ . . . SMn) and the calibration signal extracting unit 64 removes the second combined signal from the first combined signal and outputs the calibration signal SC. The calibration signal SC ideally does not contain the main signals as noise, but even if it does, the amount of noise is small. As a result, the S/N ratio is improved, the phase characteristics of the analog circuits can be estimated with high precision and highly precise calibration can be performed in a short time.

On the basis of a change in the phase of the calibration signal SC, a phase estimating unit 52a in the phase adjusting unit 52 estimates the phase characteristics of the analog circuits 62a to 62n to which the main signals having the inserted calibration signal are input, a phase controller 52b inputs phase adjustment data, which has characteristics opposite these phase characteristics, to phase adjusting units $53c_1$, to $53c_n$, and the phase adjusting units $53c_1$ to $53c_n$ perform a phase adjustment based upon the entered phase adjustment data.

As a result of the above operation, the main signals SM1 to SMn are input to the adaptive array antennas A#1 to A#n at the phases that prevailed when they were input to the phase calibration unit 50.

(C) Second Embodiment

Figure 4:
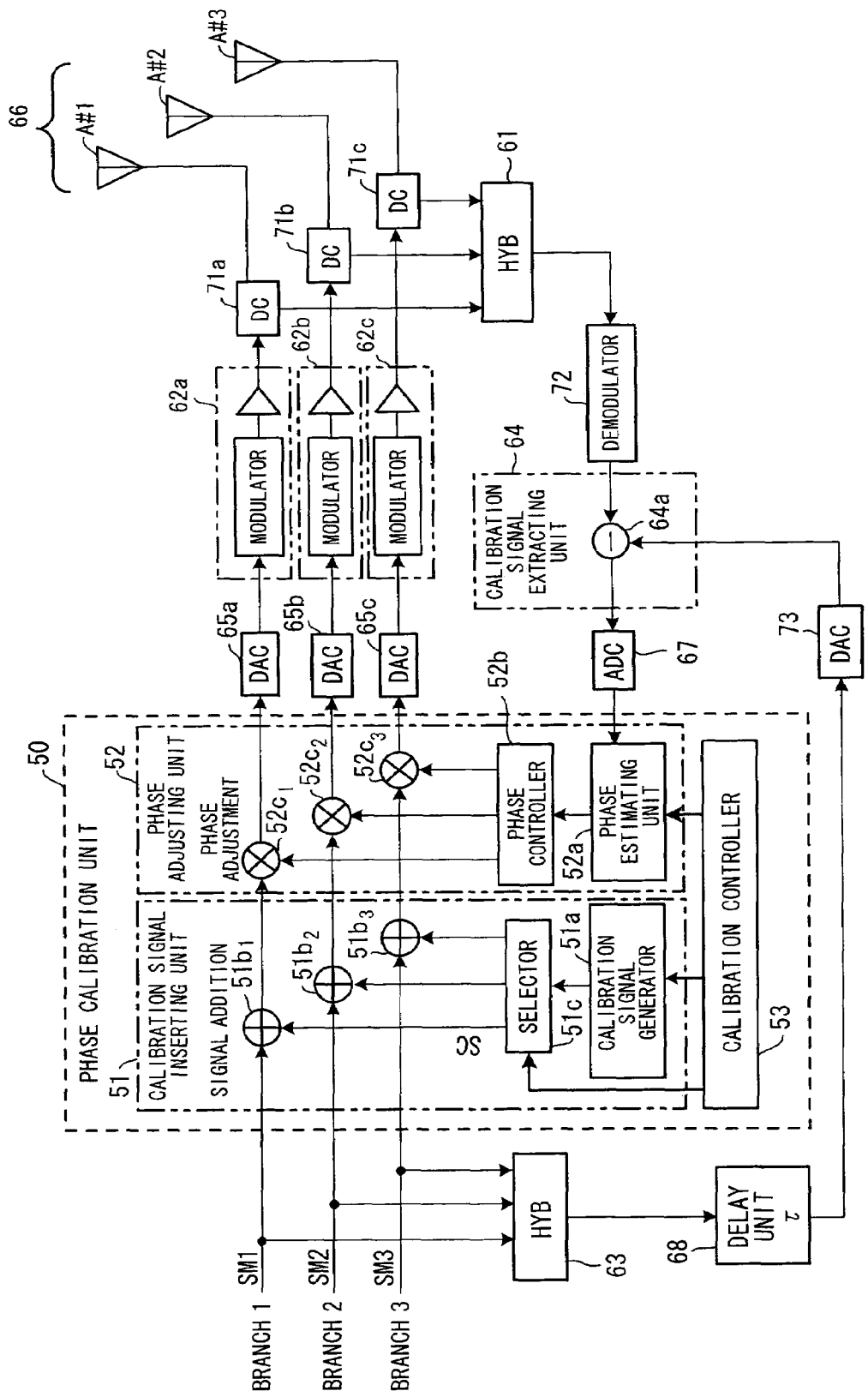
FIG. 4 is a diagram illustrating an example of the structure of an embodiment in which main signals are removed in the form of analog signals.

FIG. 4 is a diagram illustrating an example of the structure of an embodiment in which main signals are removed in the form of analog signals. This embodiment is assumed to be composed of three branches in order to simplify the description. Components in FIG. 4 identical with those of the basic arrangement shown in FIG. 3 are designated by like reference characters. The calibration signal SC generated by the calibration signal generator 51*a* is added by the adders 51*b*$_1$ to 51*b*$_3$ to the main signals SM1 to SM3 of the branches selected by a selector 51*c*. After the signals on each of the branches are subjected to an analog-to-digital conversion by the DA converters 65*a* to 65*c*, the signals are modulated and amplified by the analog circuits 62*a* to 62*c*. Directional couplers 71*a* to 71*c* situated directly below the antennas extract portions of the transmit signals on each of the branches and input the extracted signals to the hybrid (HYB) 61. The latter combines the transmit signals of each of the branches extracted by the directional couplers 71*a* to 71*c*, and a demodulator 72 demodulates the combined signal to a baseband signal and inputs the baseband signal to the calibration signal extracting unit 64.

The hybrid (HYB) 63 combines the main signals SM1 to SM3 of all branches 1 to 3, and the delay unit 68 delays this combined signal by a prescribed length of time before inputting it to the subtractor 64*a* of the calibration signal extracting unit 64. The calibration signal extracting unit 64 subtracts, in analog form, the combined signal, which is output from the hybrid 63, from the analog combined signal that is output from hybrid 61, thereby extracting the calibration signal SC, and inputs the calibration signal SC to the phase adjusting unit 52 upon first converting it to a digital signal by the AD converter 67.

On the basis of a change in the phase of the calibration signal SC that has been input thereto, the phase estimating unit 52*a* of the phase adjusting unit 52 estimates the phase characteristics of the analog circuits 62*a* to 62*c* to which the main signals having the inserted calibration signal are input, the phase controller 52*b* inputs phase adjustment data, which has characteristics opposite these phase characteristics, to the phase adjusting units 53*c*$_1$ to 53*c*$_3$, and the phase adjusting units 53*c*$_1$ to 53*c*$_3$ perform a phase adjustment based upon the entered phase adjustment data.

As a result of the above operation, the main signals SM1 to SMn are input to the adaptive array antennas A#1 to A#n at the phases that prevailed when they were input to the phase calibration unit 50.

(D) Third Embodiment

Figure 5:
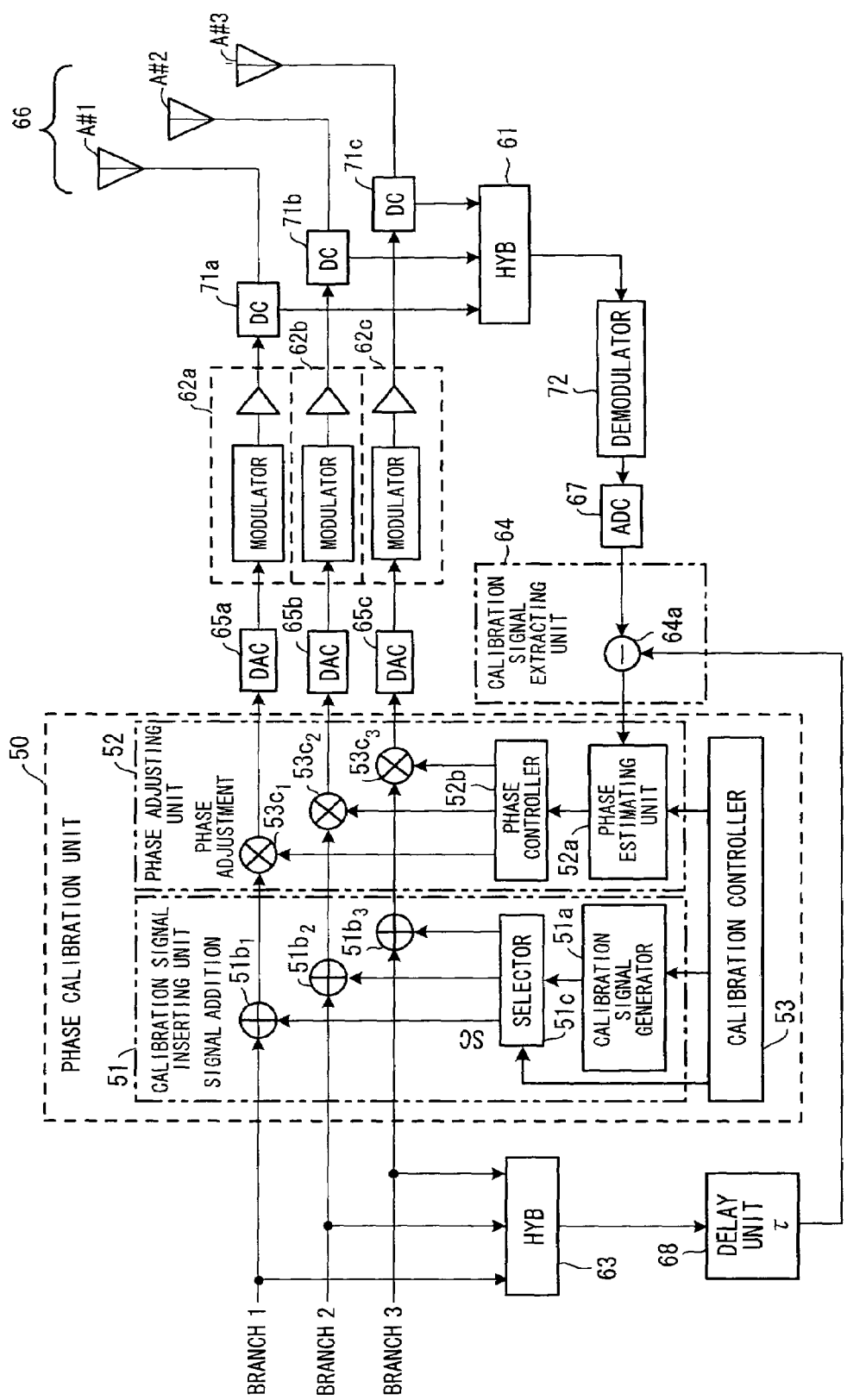
FIG. 5 is a diagram illustrating an example of the structure of an embodiment in which main signals are removed in the form of digital signals.

FIG. 5 is a diagram illustrating an example of the structure of an embodiment in which main signals are removed in the form of digital signals. Components in FIG. 5 identical with those of the second embodiment shown in FIG. 4 are designated by like reference characters. This embodiment differs from that of FIG. 4 in that (1) the combined signal that is output from the hybrid 61 is demodulated by the demodulator 72 and then converted to a digital signal by the AD converter 67, and (2) the subtractor 64*a* of the calibration signal extracting unit 64 subtracts, in digital form, the combined signal, which is output from the hybrid 63, from the combined signal that is output from hybrid 61, thereby extracting the calibration signal SC, and inputs the calibration signal SC to the phase adjusting unit 52.

The third embodiment is characterized in that the removal of the main signals is carried out in the form of digital signals, which are obtained after an analog-to-digital conversion, and not in the form of analog signals. In contrast with the method that deals with analog signals, the digital implementation of this embodiment makes integration possible.

(E) Fourth Embodiment

Figure 6:
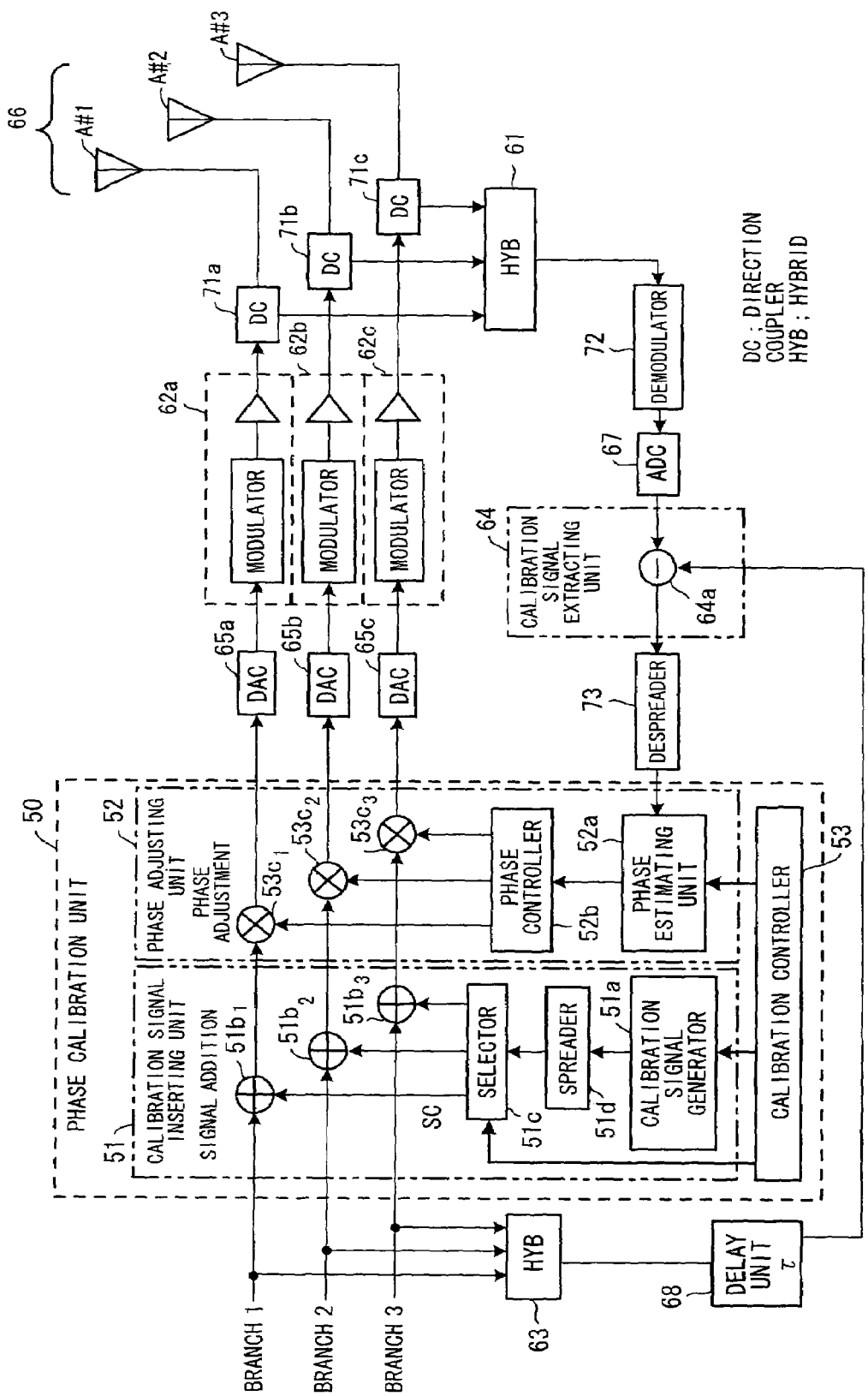
FIG. 6 is a diagram illustrating an example of the structure of a fourth embodiment in which a calibration signal is spread by a spreading code and added to a main signal, and in which the calibration signal is extracted by despreading.

FIG. 6 is a diagram illustrating an example of the structure of a fourth embodiment in which a calibration signal is spread by a spreading code and added to a main signal, and in which the calibration signal is extracted by despreading. Components in FIG. 6 identical with those of the third embodiment shown in FIG. 5 are designated by like reference characters. This embodiment differs in that (1) the calibration signal inserting unit 51 is provided with a spreader 51*d* and the despreader 51*d* spreads the calibration signal SC by a spreading code and inserts the spread signal into the main signals on each of the branches in turn, and (2) the output of the calibration signal extracting unit 64 is provided with a despreader 73, which despreads the output signal of the calibration signal extracting unit 64 by the spreading code, extracts the calibration signal and inputs the calibration signal to the phase estimating unit 52*a*. Though the fourth embodiment requires despread processing in the estimating of phase, it is possible to improve the S/N ratio of the calibration signal by raising the process gain. As a result, the power of the inserted calibration signal can be reduced.

(F) Fifth Embodiment

The first to fourth embodiments described above are implementations that do not particularly take multicarriers into consideration. However, operation using a plurality of carriers on one branch is conceivable in an actual apparatus. If the arrangement is one in which a separate transmitter is provided for every carrier, then it would suffice for a plurality of transmitters having the structure shown in FIG. 6 to be provided. In actuality, however, there are many cases where the structure is such that a plurality of carriers are transmitted collectively by a single transmitter and a single antenna element.

Figure 7:
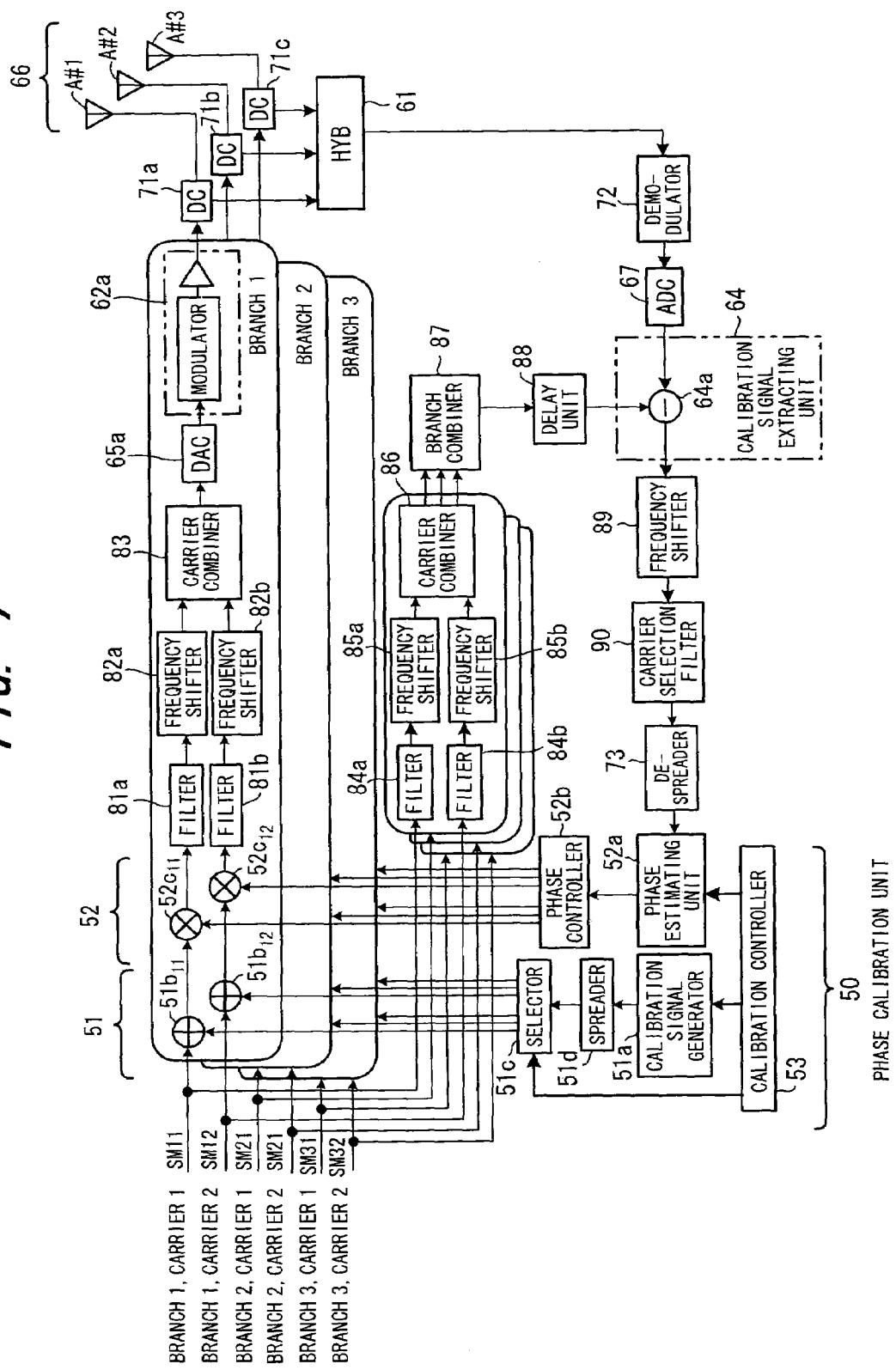
FIG. 7 is a structural view of a fifth embodiment for an arrangement in which a plurality of carriers are transmitted on one branch.

FIG. 7 is a structural view of a fifth embodiment for an arrangement in which a plurality of carriers are transmitted on one branch. This structure is adapted to calibrate the phase of a main signal of each carrier on each branch. FIG. 7 illustrates a case where two there are two carriers on one branch.

Main signals SM11, SM21, SM31 conform to a carrier 1 on respective ones of branches 1 to 3 and correspond to the main signals SM1, SM2, SM3 of FIG. 6, and main signals SM12, SM22, SM32 conforming to a carrier 2 are multiplexed anew. The calibration signal SC is inserted into the main signals of carriers 1, 2 on each of the branches 1 to 3 in turn, and the phases of the main signals of each of the carriers on each of the branches are calibrated one at a time in turn. More specifically, operation is as follows:

(1) the calibration signal SC is inserted into the main signal of carrier 1 on branch 1 and the phase of the main signal of carrier 1 is adjusted;

(2) the calibration signal SC is inserted into the main signal of carrier 2 on branch 1 and the phase of the main signal of carrier 2 is adjusted;

(3) the calibration signal SC is inserted into the main signal of carrier 1 on branch 2 and the phase of the main signal of carrier 1 is adjusted; and (4) the procedure is repeated to adjust the phases of the main signals of carriers 1, 2 on all branches 1 to 3.

Filters 81*a*, 81*b* on each branch apply waveshaping and a sample-rate conversion to the main signals of carriers 1, 2, which are output from the phase calibration unit 50, a frequency shifter 82*a* up-shifts the main signal of carrier 1 from the baseband frequency to a frequency f1, and a frequency shifter 82b up-shifts the main signal of carrier 2 from the baseband frequency to a frequency f2. A carrier combiner 83 combines the carrier signals of the frequency shifters 82a, 82b, the DA converter 65a converts the digital combined carrier signal to an analog signal, and the analog circuit 62a modulates and amplifies the analog combined carrier signal and outputs the resultant signal. The directional couplers 71a to 71c situated directly below the antennas extract portions of the transmit signals on each of the branches and input the extracted signals to the hybrid (HYB) 61. The latter combines the transmit signals of each of the branches extracted by the directional couplers 71a to 71c, the demodulator 72 demodulates the combined signal to a baseband signal and the AD converter 67 subjects the demodulated signal to an analog-to-digital conversion and inputs the digital signal to the calibration signal extracting unit 64.

Filters 84a, 84b on each branch apply waveshaping and a sample-rate conversion to the main signals SM11, SM12 of carriers 1, 2 before they are input to the phase calibration unit 50, a frequency shifter 85a up-shifts the main signal of carrier 1 from the baseband frequency to the frequency f1, and a frequency shifter 85b up-shifts the main signal of carrier 2 from the baseband frequency to the frequency f2. A carrier combiner 86 combines the carrier signals of the frequency shifters 85a, 85b, a branch combiner 87 combines the combined carrier signals of each of the branches, and a delay unit 88 delays the combined branch signal by a prescribed length of time before inputting it to the calibration signal extracting unit 64. It should be noted that filters 84a, 84b, frequency shifters 85a, 85b and carrier combiner 86 operate in exactly the same manner as the filters 81a, 81b, frequency shifters 82a, 82b and carrier combiner 83 on the actual transmit-signal paths.

The calibration signal extracting unit 64 subtracts, in digital form, the second combined signal, which is output from the branch combiner 87, from the first combined signal that enters from the hybrid 61 via the demodulator 72 and AD converter 67. As a result, the main signals are cancelled from the first combined signal. A frequency shifter 89 down-shifts the frequency of the input signal in conformity with the carrier into which the calibration signal SC has been inserted. For example, the frequency shifter 89 down-shifts the frequency of the input signal to f1 if the calibration signal SC has been inserted into the main signal of carrier 1, and down-shifts the frequency of the input signal to f2 if the calibration signal SC has been inserted into the main signal of carrier 2. A carrier selector 90 selects the baseband signal, the despreader 73 despreads the input signal by the spreading code, extracts the calibration signal and inputs the extracted calibration signal to the phase estimating unit 52a.

On the basis of a change in the phase of the calibration signal SC that has been input thereto, the phase estimating unit 52a estimates the phase characteristics of the analog circuits of branches 1 to 3, carriers 1, 2 to which the main signals having the inserted calibration signal are input, the phase controller 52b inputs phase adjustment data, which has characteristics opposite these phase characteristics, to phase adjusting units $52c_{11}$ to $52c_{32}$, and the phase adjusting units $52c_{11}$ to $52c_{32}$ perform a phase adjustment based upon the entered phase adjustment data.

As a result of the above operation, the main signals SM11 to SM32 are input to the adaptive array antennas A#1 to A#n at the phases that prevailed when they were input to the phase calibration unit 50.

Figure 9:
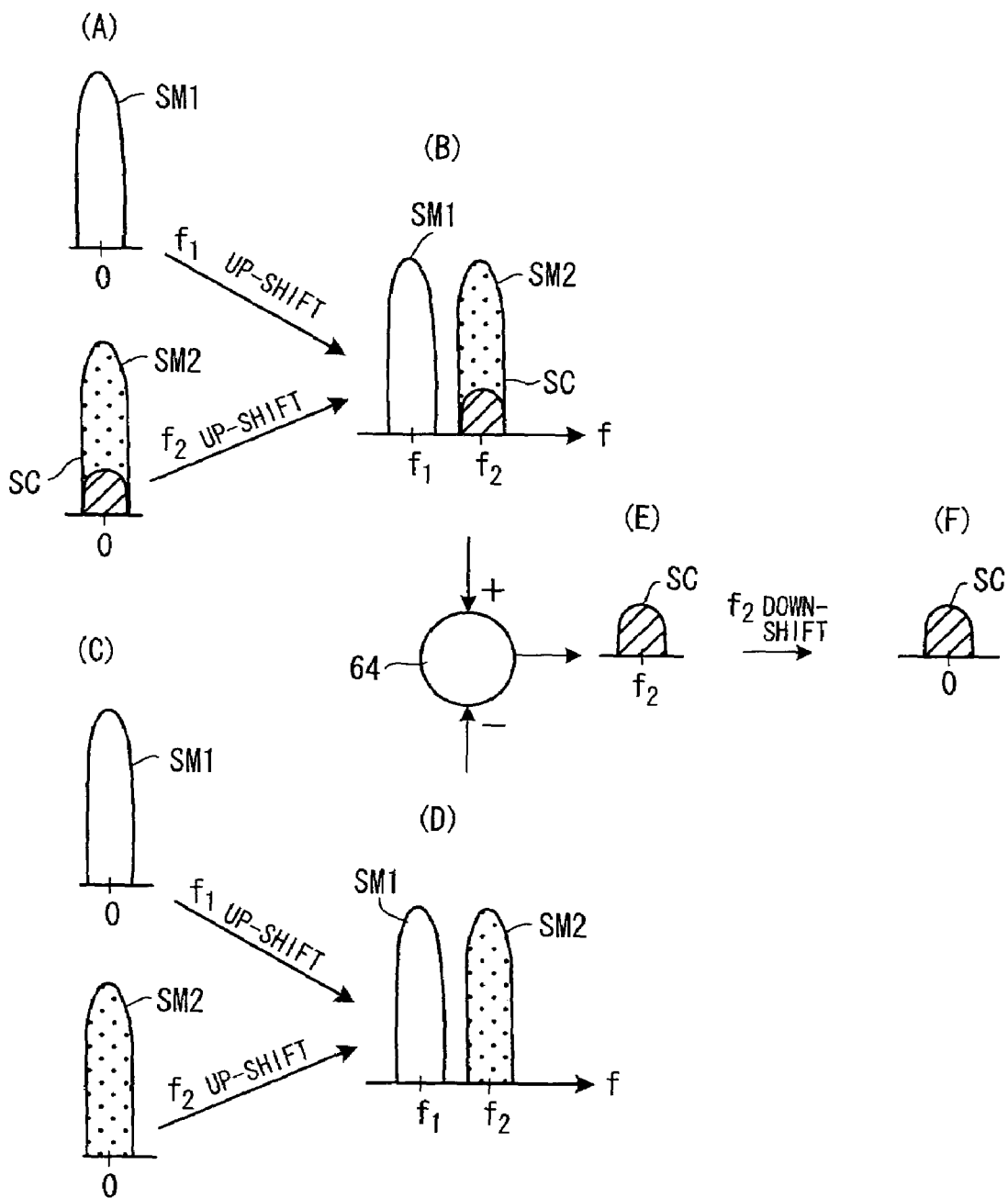
FIG. 9 is another diagram useful in describing the operation of FIG. 7.

FIG. 8 is a diagram useful in describing the operation of FIG. 7. FIG. 8 illustrates operation concerning carriers 1, 2 on branch 1 only. When the calibration signal SC is inserted into the main signal SM11 of carrier 1 and a frequency shift is performed by the frequency shifters 82a, 82b, the main signals SM11, SM12 become as shown at (B) in FIG. 8. Further, if the main signals SM11, SM12 are frequency-shifted by the frequency shifters 85a, 85b, the main signals SM11, SM12 become as shown at (D). When the calibration signal extracting unit 64 subtracts (D) from (B), the calibration signal SC of carrier frequency f1 is obtained, as shown at (E). Therefore, when the frequency of the calibration signal SC is down-shifted to f1 by the frequency shifter 89, the calibration signal SC of the baseband is obtained. The despreader 73 despreads the calibration signal SC by the despreading code, thereby further improving the S/N ratio. FIG. 9 is another diagram useful in describing the operation of FIG. 7 and illustrates a case where the calibration signal SC has been inserted into the main signal SM12 of carrier 2.

Figure 10:
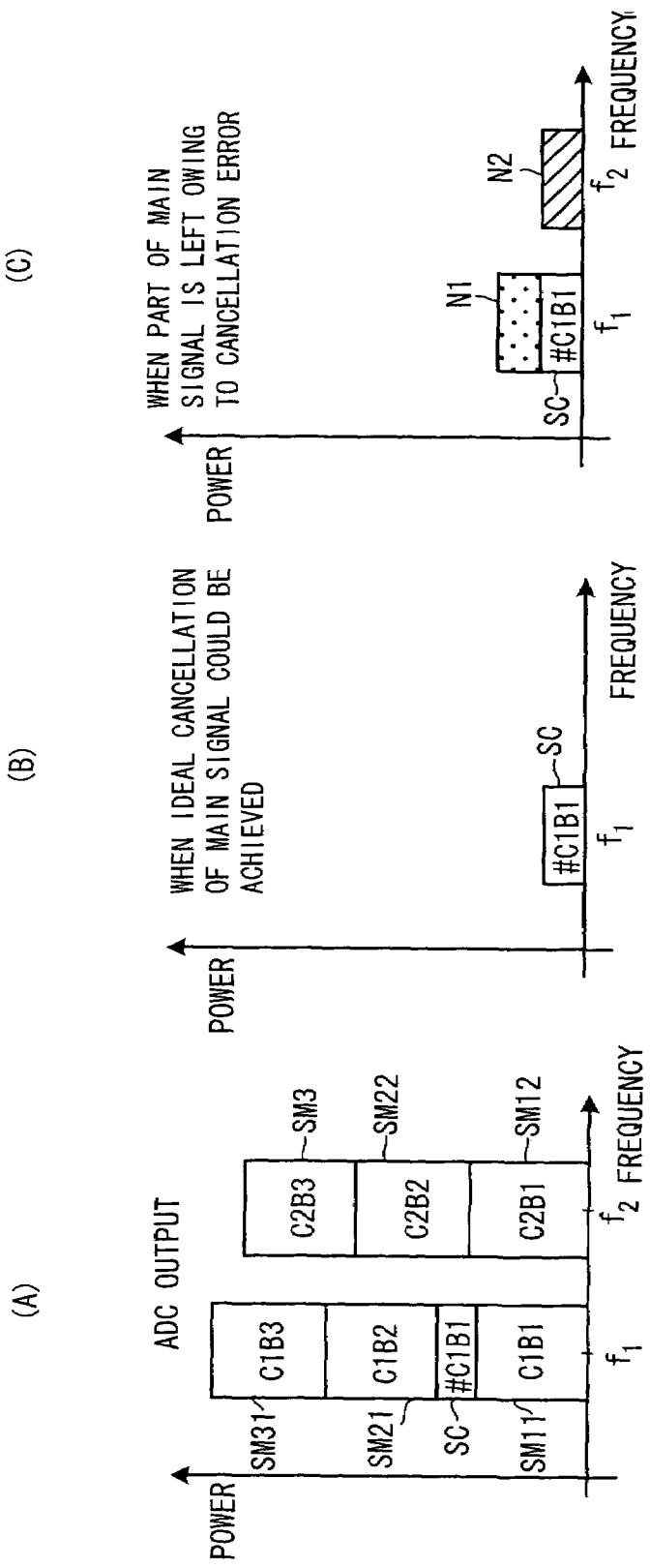
FIG. 10 is a diagram useful in describing removal of main signals in a plurality of carriers.

FIG. 10 is a diagram useful in describing removal of main signals in a plurality of carriers in FIG. 7. Here reference characters B1 to B3 signify branches 1 to 3, and C1, C2 represent carriers 1, 2. Further, (A) in FIG. 10 illustrates the power of the main signals SM11 to SM32 and calibration signal SC of frequencies f1, f2 obtained after the combined signal from the hybrid 61 is demodulated and an analog-to-digital conversion applied, (B) illustrates the output from the calibration signal extraction unit in a case where all main signals have been removed ideally, and (C) illustrates the output from the calibration signal extraction unit in a case where noise N1, N2 remains. It should be noted that noise N2 in (C) is eliminated by the carrier selection filter 90.

(G) Sixth Embodiment

Figure 11:
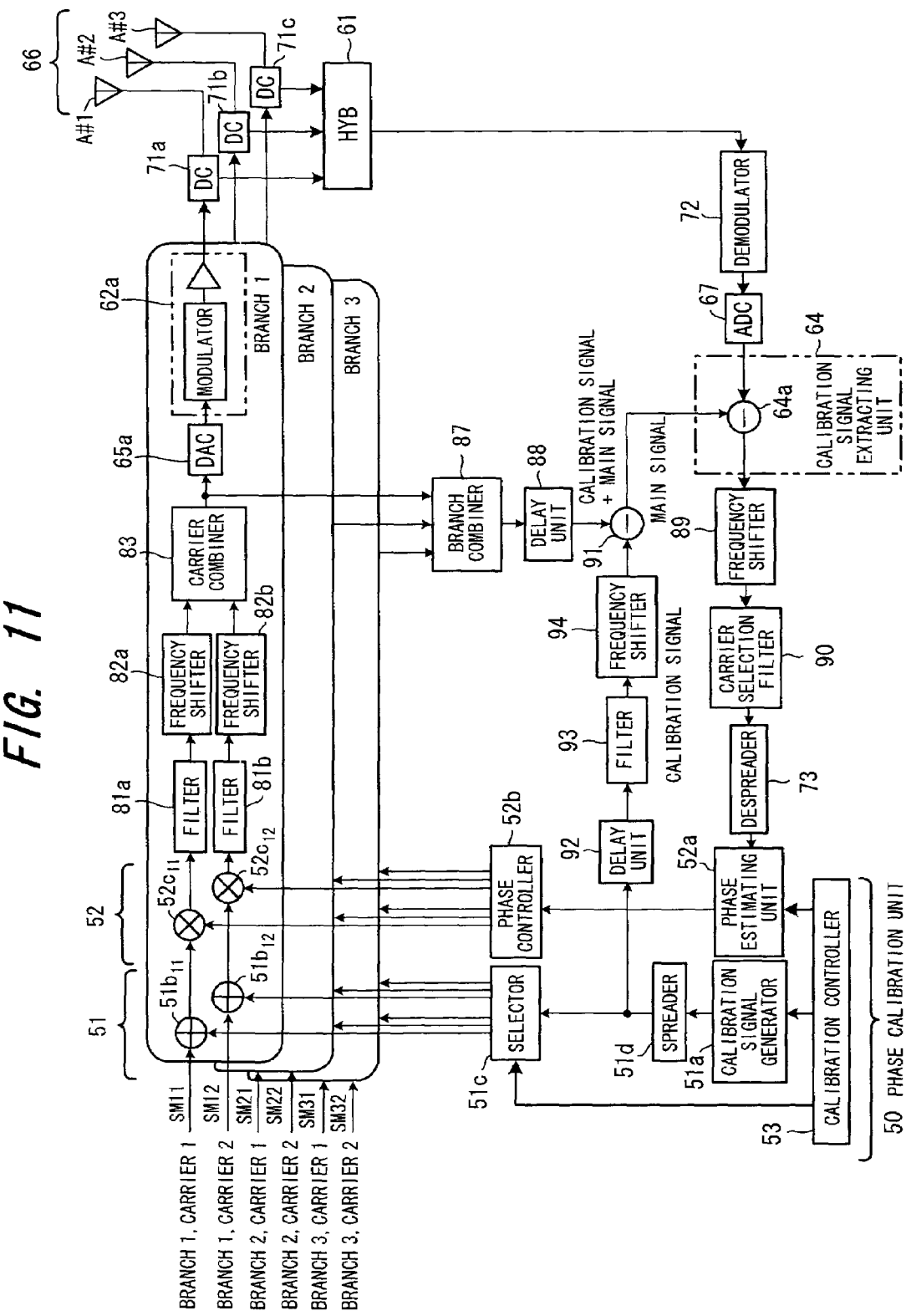
FIG. 11 is a structural view of a sixth embodiment for an arrangement in which a plurality of carriers are transmitted on one branch.

FIG. 11 is a structural view of a sixth embodiment for an arrangement in which a plurality of carriers are transmitted on one branch. Components in FIG. 11 identical with those of the fifth embodiment shown in FIG. 7 are designated by like reference characters. In the fifth embodiment, separate frequency shifters 85a, 85b and carrier combiner 86 for producing the main signals to be removed are required, as a result of which the circuitry is large in scale. Accordingly, in the sixth embodiment, as illustrated in FIG. 11, the output obtained by combining the carriers of the transmit-signal paths (namely the output signal of the carrier combiner 83) is extracted, a branch combiner 87 combines these extracted signals and the calibration signal contained in the combined signal undergoes subtraction in a subtractor 91, whereby the second combined signal, which does not contain the calibration signal, is produced.

The calibration signal subtracted in the subtractor 91 is produced as follows: A delay unit 92 delays the calibration signal SC by a prescribed length of time, a filter 93 applies waveshaping and a sample-rate conversion to the calibration signal SC, and a frequency shifter 94 up-shifts the frequency of the input signal in accordance with the carrier into which the calibration signal SC has been inserted. For example, the frequency shifter 94 up-shifts the frequency of the input signal to f1 if the calibration signal SC has been inserted into the main signal SM11 of carrier 1, and up-shifts the frequency of the input signal to f2 if the calibration signal SC has been inserted into the main signal SM12 of carrier 2. The subtractor 91 subtracts the calibration signal, which is output from the frequency shifter 94, from the combined signal obtained by combining the branches in the branch combiner 87, and outputs the second combined signal, which does not contain the calibration signal. The calibration signal extracting unit 64 digitally subtracts the second combined signal, which is output from the subtractor 91, from the first combined signal that enters from hybrid 61 via the demodulator 72 and AD converter 67. As a result, the main signal is cancelled from the first combined signal. From this point onward, calibration similar to that of the fifth embodiment is carried out.

(H) Seventh Embodiment

Figure 12:
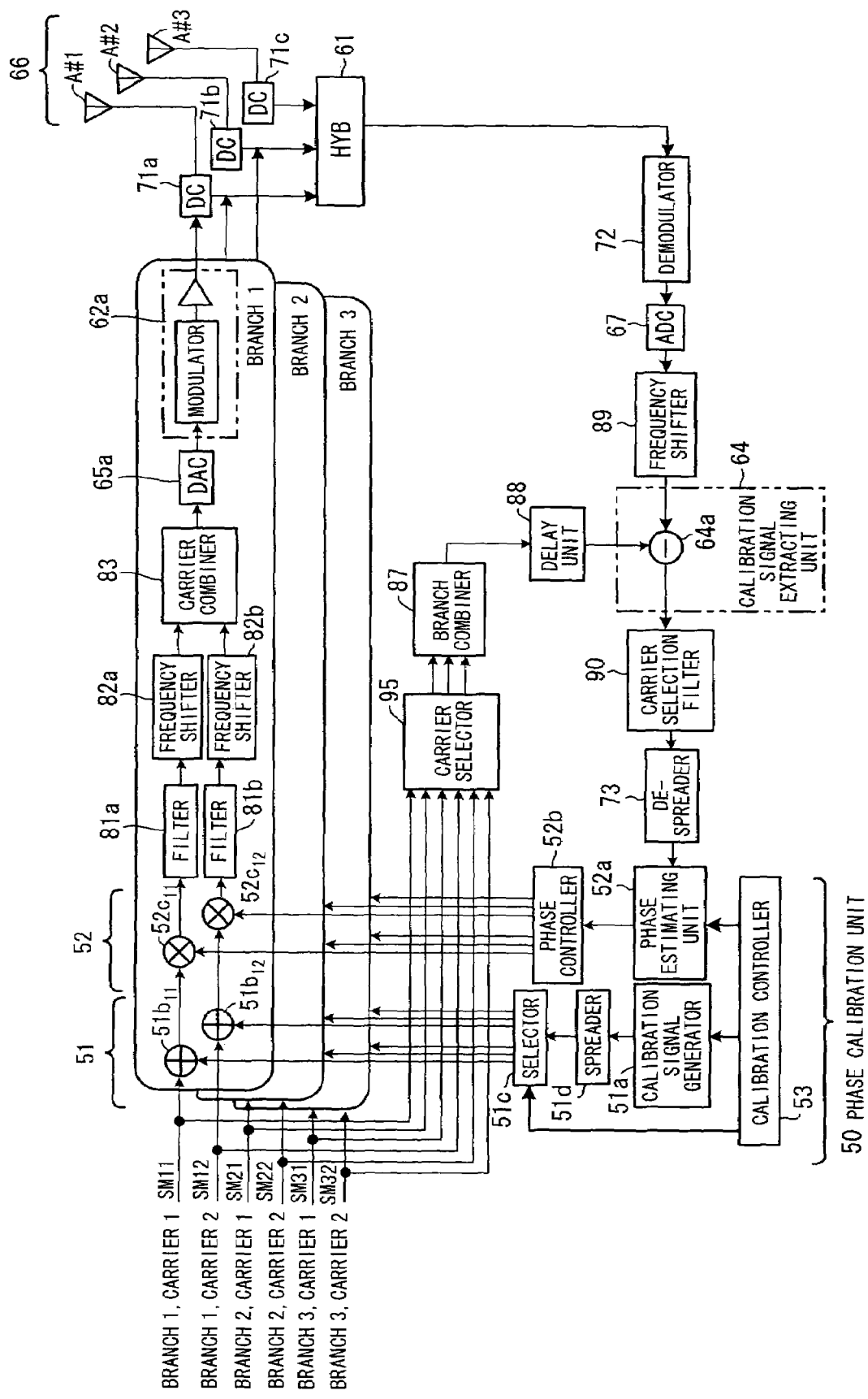
FIG. 12 is a structural view of a seventh embodiment for an arrangement in which there is one branch and a plurality of carriers.

FIG. 12 is a structural view of a seventh embodiment for an arrangement in which a plurality of carriers are transmitted on one branch. Components in FIG. 12 identical with those of the fifth embodiment shown in FIG. 7 are designated by like reference characters. In the fifth embodiment, separate frequency shifters 85a, 85b and carrier combiner 86 for producing the main signals to be removed are required, as a result of which the circuitry is large in scale. Accordingly, in the seventh embodiment, a simplification is achieved by adopting an arrangement in which carriers other than carriers to undergo calibration are eliminated by the carrier selection filter 90 shown in FIG. 12.

The frequency shifter 89 down-shifts the frequency of the first combined signal (the signal obtained by demodulating the combined signal from hybrid 61) in conformity with the carrier into which the calibration signal SC has been inserted. For example, the frequency shifter 89 down-shifts the frequency of the input signal to f1 if the calibration signal SC has been inserted into the main signal SM11 of carrier 1, and down-shifts the frequency of the input signal to f2 if the calibration signal SC has been inserted into the main signal SM12 of carrier 2.

Meanwhile, from the main signals on each of the branches, a carrier selector 95 selects only the main signals corresponding to the carriers into which the calibration signal SC has been selected, the branch combiner 87 combines the main signals on branches 1 to 3 conform to the carriers in which the calibration signal has been inserted, and inputs the combined signal to the calibration signal extracting unit 64 after the prescribed time delay is applied. The calibration signal extracting unit 64 subtracts the combined signal, which is obtained from the branch combiner 87, from the output of the frequency shifter 89.

Figure 13:
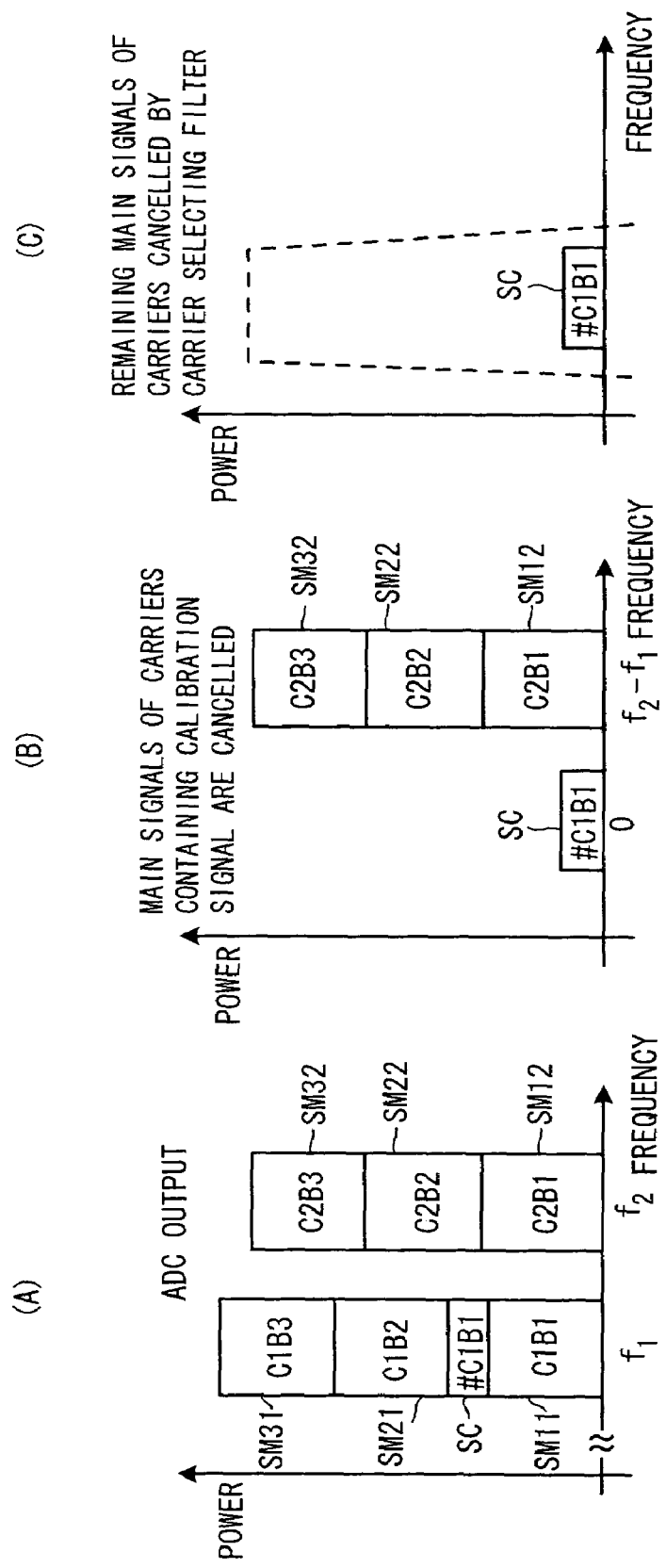
FIG. 13 is a diagram useful in describing the operation of FIG. 12.

FIG. 13 is a diagram useful in describing the operation of FIG. 12. Here (A) illustrates the power of the main signals SM11 to SM32 and calibration signal SC of frequencies f1, f2 obtained after the combined signal from the hybrid 61 is demodulated and an analog-to-digital conversion applied, and (B) illustrates the output of the calibration signal extracting unit 64 in the ideal case. Specifically, only the calibration signal SC is contained in the signal as the baseband frequency component, and the main signals SM12, SM22, SM32 are contained in the signal as the f2-f1 frequency component. The carrier selection filter 90 passes only the baseband component, thereby eliminating the f2-f1 frequency component, as shown at (C) in FIG. 13, selecting the calibration signal SC and applying the calibration signal SC to the despreader 73. From this point onward, calibration similar to that of the fifth embodiment is carried out.

(I) Eighth Embodiment

Figure 14:
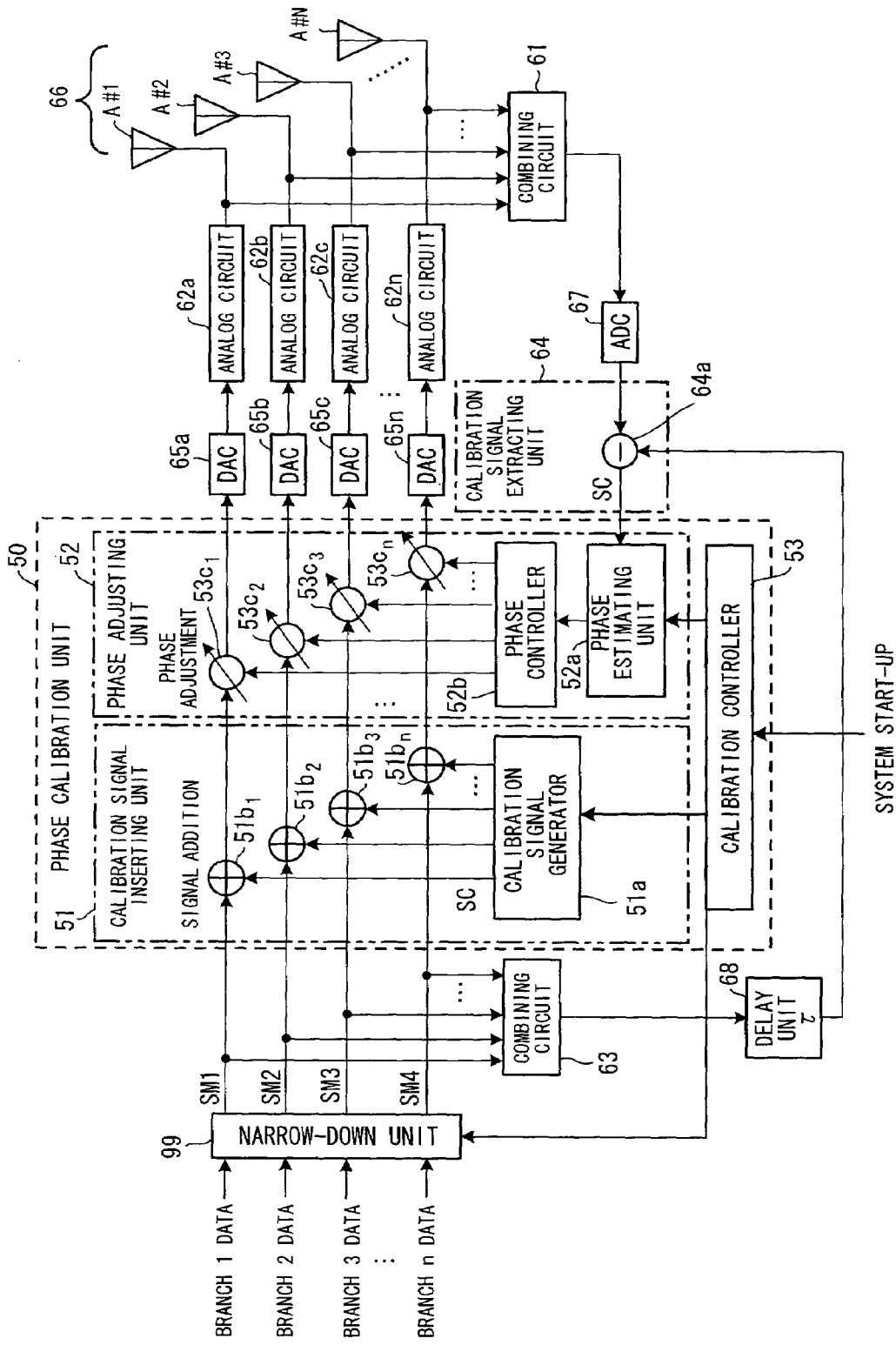
FIG. 14 is a structural view of an eighth embodiment for implementing calibration at start-up of an adaptive array system (operation start-up after introduction of power)

FIG. 14 is a structural view of an eighth embodiment for implementing calibration at start-up of an adaptive array system (operation start-up after introduction of power). Components in FIG. 14 identical with those of the first embodiment shown in FIG. 3 are designated by like reference characters. This embodiment differs from that of FIG. 3 in that (1) there is provided a narrow-down unit 99 for attenuating the level of the main signal on each branch, namely the level of the output signal from the transmit beam former (not shown), and (2) the calibration controller 53 controls calibration at the time of system operation start-up.

Figure 15:
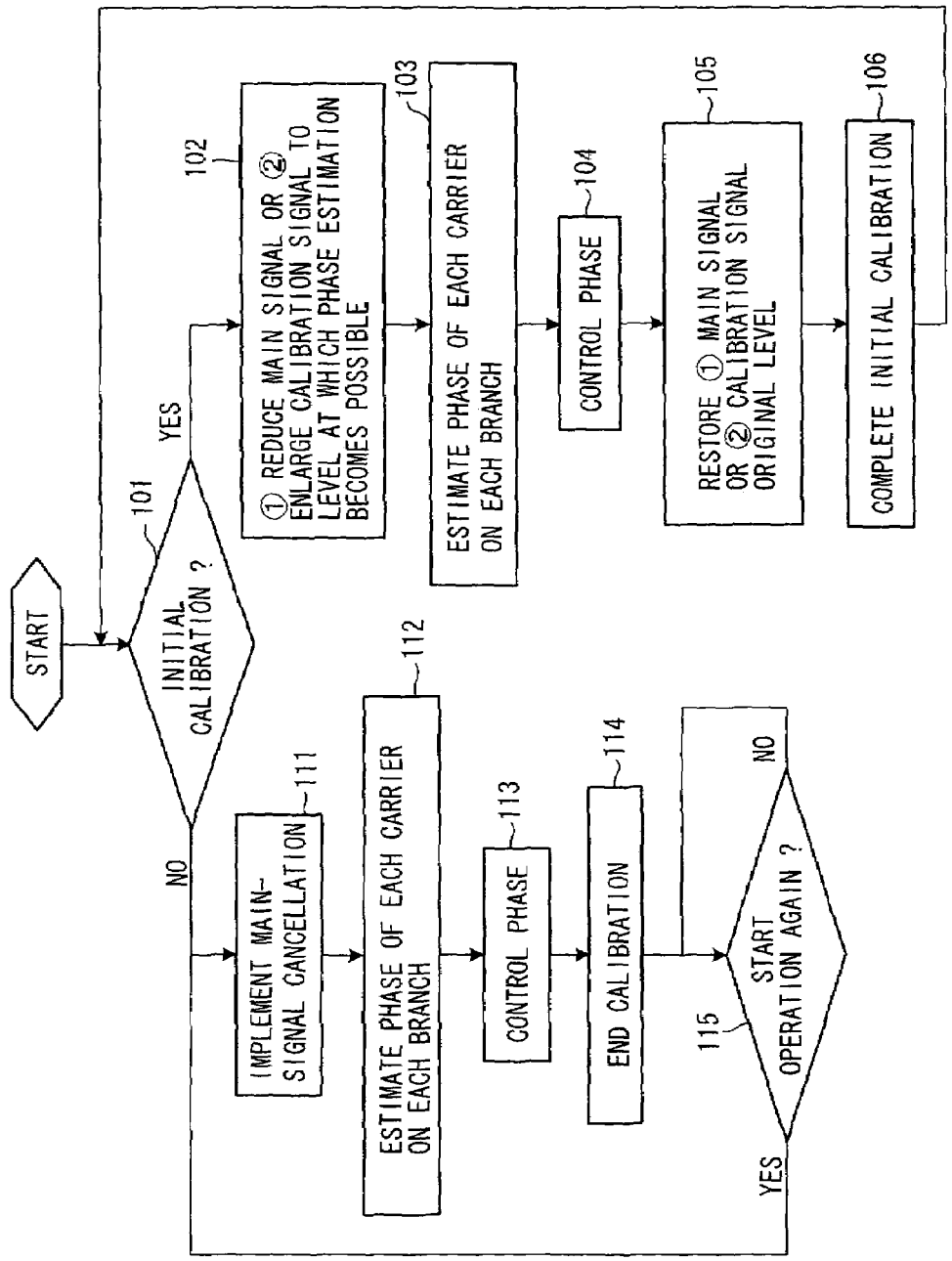
FIG. 15 is a first calibration control flowchart.

FIG. 15 is a first calibration control flowchart illustrating the operation of the calibration controller 53. In the initial state (the state in which calibration has not been performed even a single time), removal of a main signal cannot be carried out. In first calibration control, therefore, calibration is performed initially by adopting a method of reducing the main signal or enlarging the calibration signal. Once calibration has been performed, it becomes possible to remove the main signal from the feedback signal. From the second time onward, therefore, the main signal or calibration signal is returned to the original level and high-precision calibration is carried out in accordance with the first to seventh embodiments.

Figure 21:
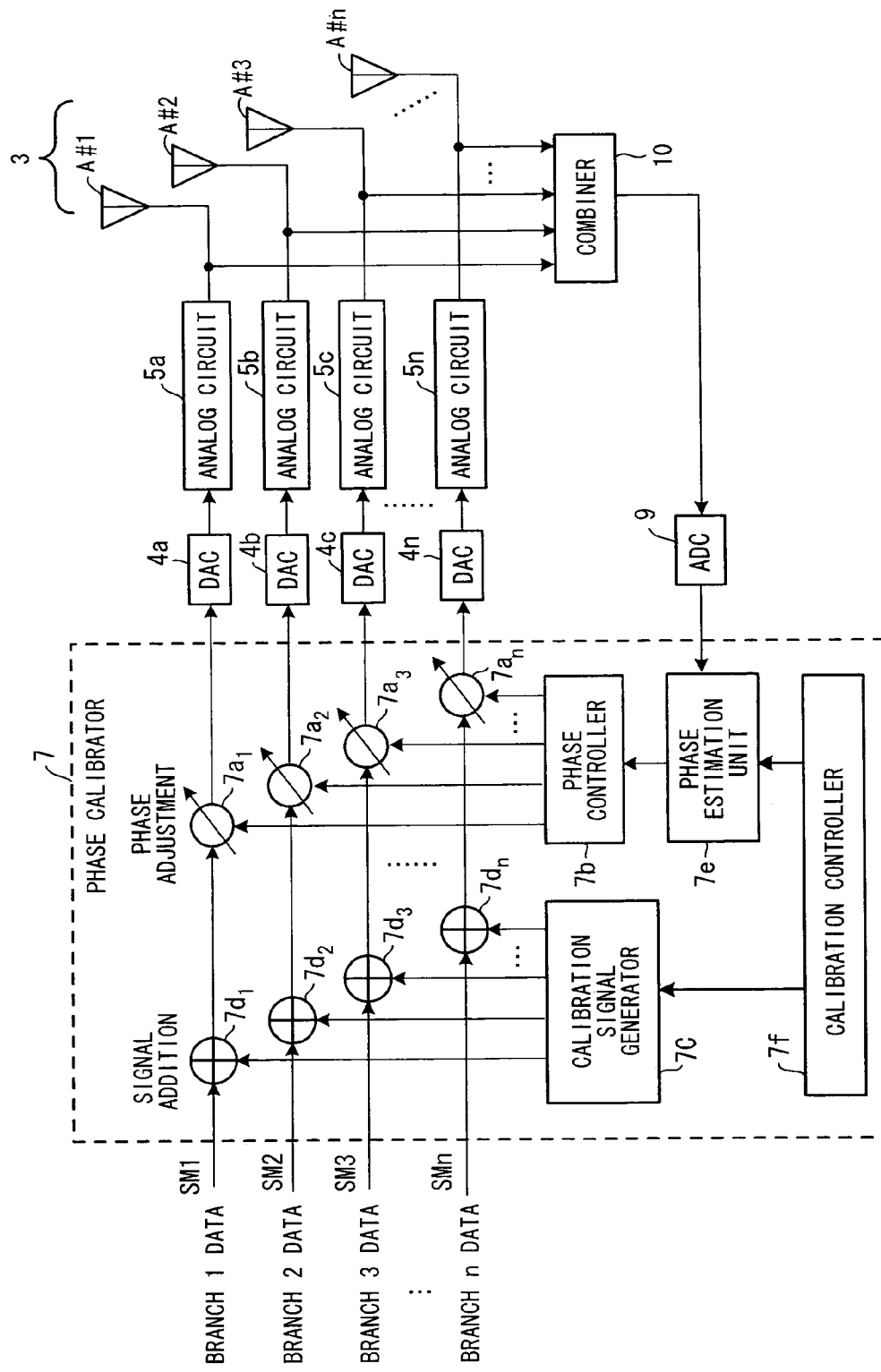
FIG. 21 is a diagram illustrating an adaptive array antenna system (based upon a combining scheme) having components for measuring the phase characteristic (phase lead/lag characteristic) of an analog circuit according to the prior art.
Figure 22:
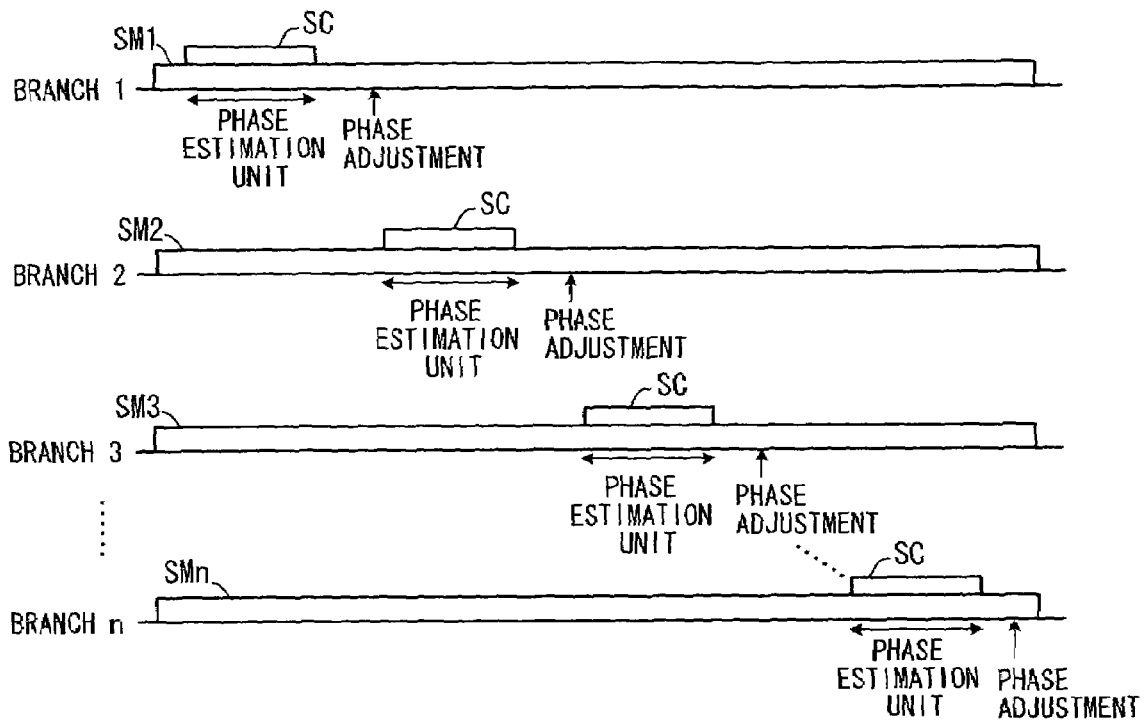
FIG. 22 is a diagram for describing the timing at which a calibration signal is inserted into a transmit signal of each branch according to the prior art.

More specifically, the calibration controller 53 determines whether the system is in the initial calibration state (step 101). If the system is in the initial calibration state, then either (1) the main signal is reduced or (2) the calibration signal is enlarged until it becomes possible to estimate the phase of each branch (step 102). In order to reduce the main signal, the narrow-down unit 99 is instructed to attenuate the main signal. In the state mentioned above, the phase characteristic of each carrier on each branch is estimated and phase control is applied by a technique similar to that of the conventional method shown in FIG. 21 (steps 103, 104). If phase control of each carrier on each branch is finished, then either (1) the main signal is restored to its original level or (2) the calibration signal is restored to its original level (step 105) and initial calibration is completed (step 106).

Calibration as described in the first embodiment is then carried out. Specifically, the main-signal cancellation function is implemented and the main signal is cancelled from the feedback signal (step 111). The phase characteristic of each carrier on each branch is estimated and phase control is performed (steps 112, 113). If phase control of each carrier on each branch is finished, then calibration is quit (step 114). Monitoring is then performed to determine whether a condition for starting the calibration operation again is satisfied (step 115). If the condition is satisfied, then calibration is executed by the processing of steps 111 onward. The condition for starting calibration again is satisfied when a predetermined period of time has elapsed, which occurs periodically, or when calibration is requested in response to a change in the environment.

Figure 16:
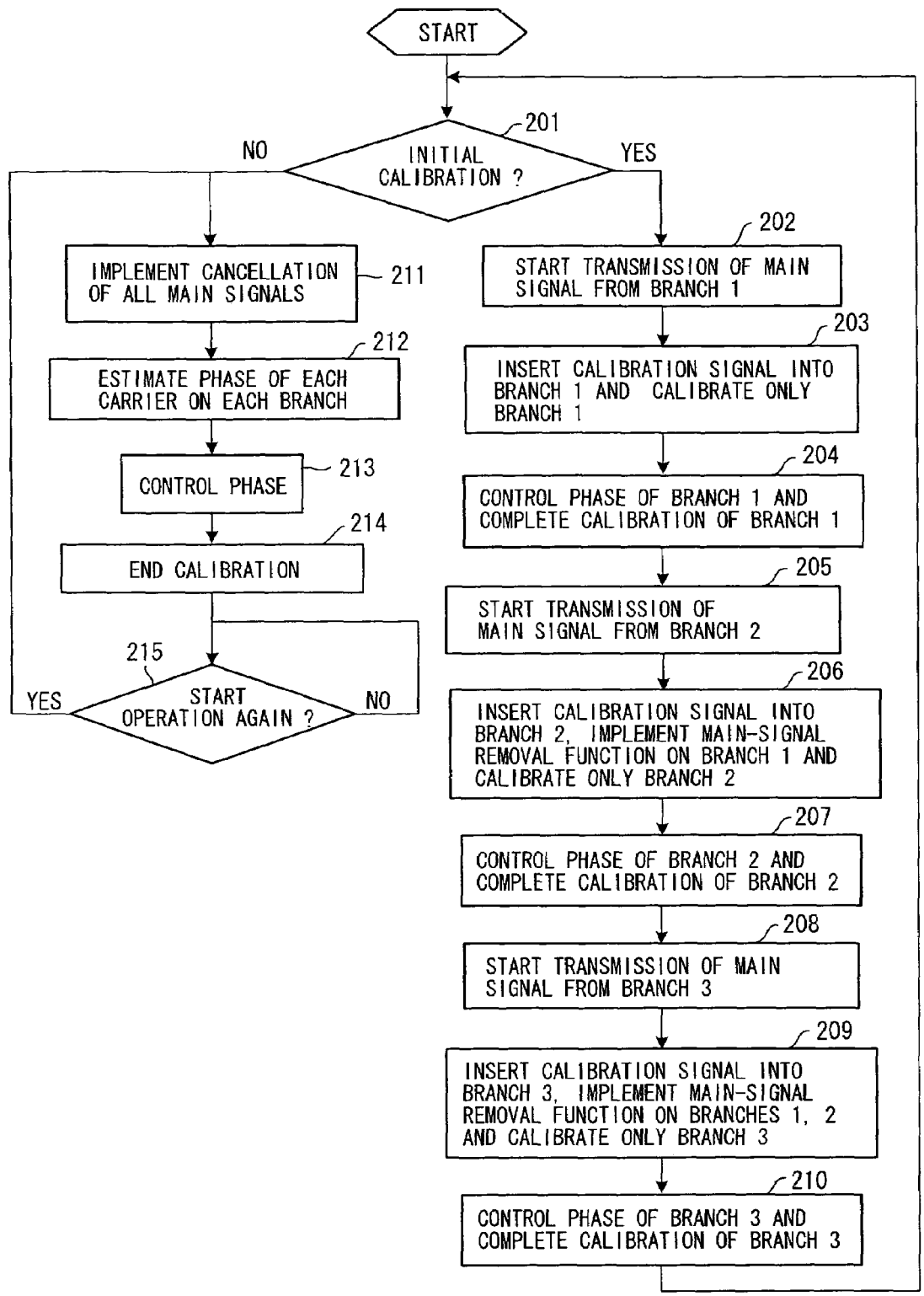
FIG. 16 is a second calibration control flowchart.
Figure 17:
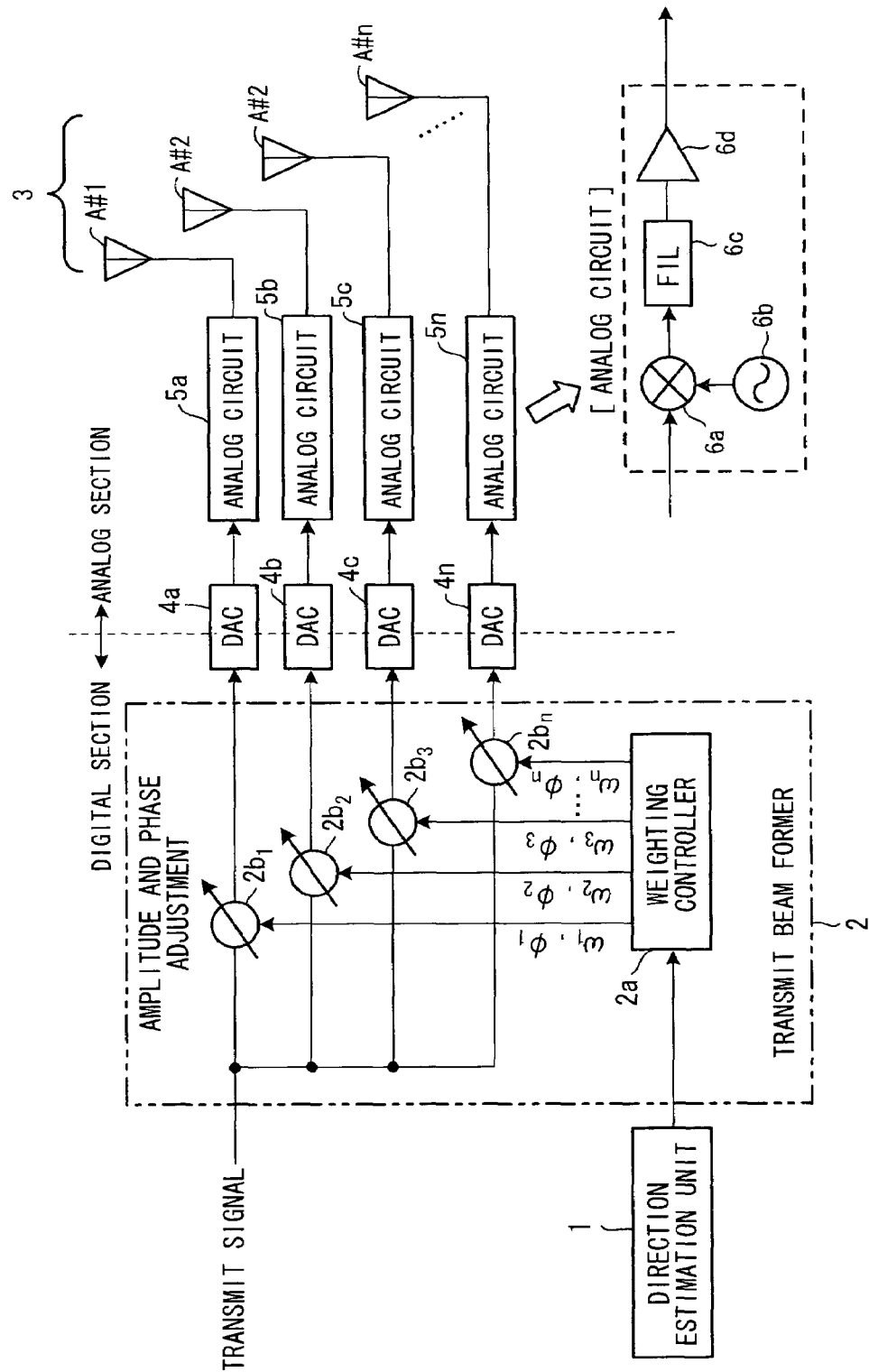
FIG. 17 is a diagram illustrating the configuration of a base-station adaptive array antenna system according to the prior art.
Figure 18:
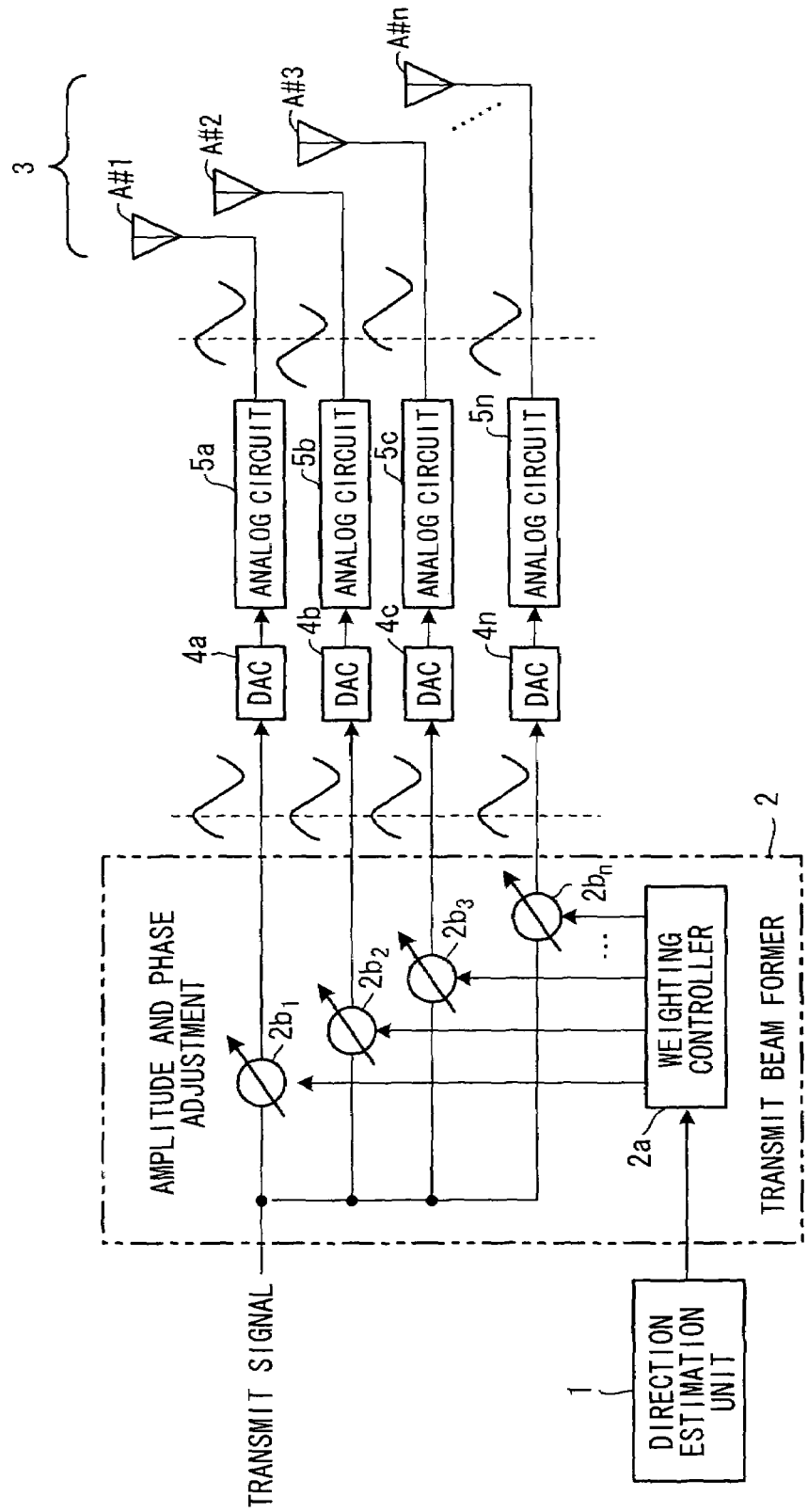
FIG. 18 is a diagram useful in describing deviation of each branch ascribable to amplitude and phase variation of analog parts according to the prior art.
Figure 19:
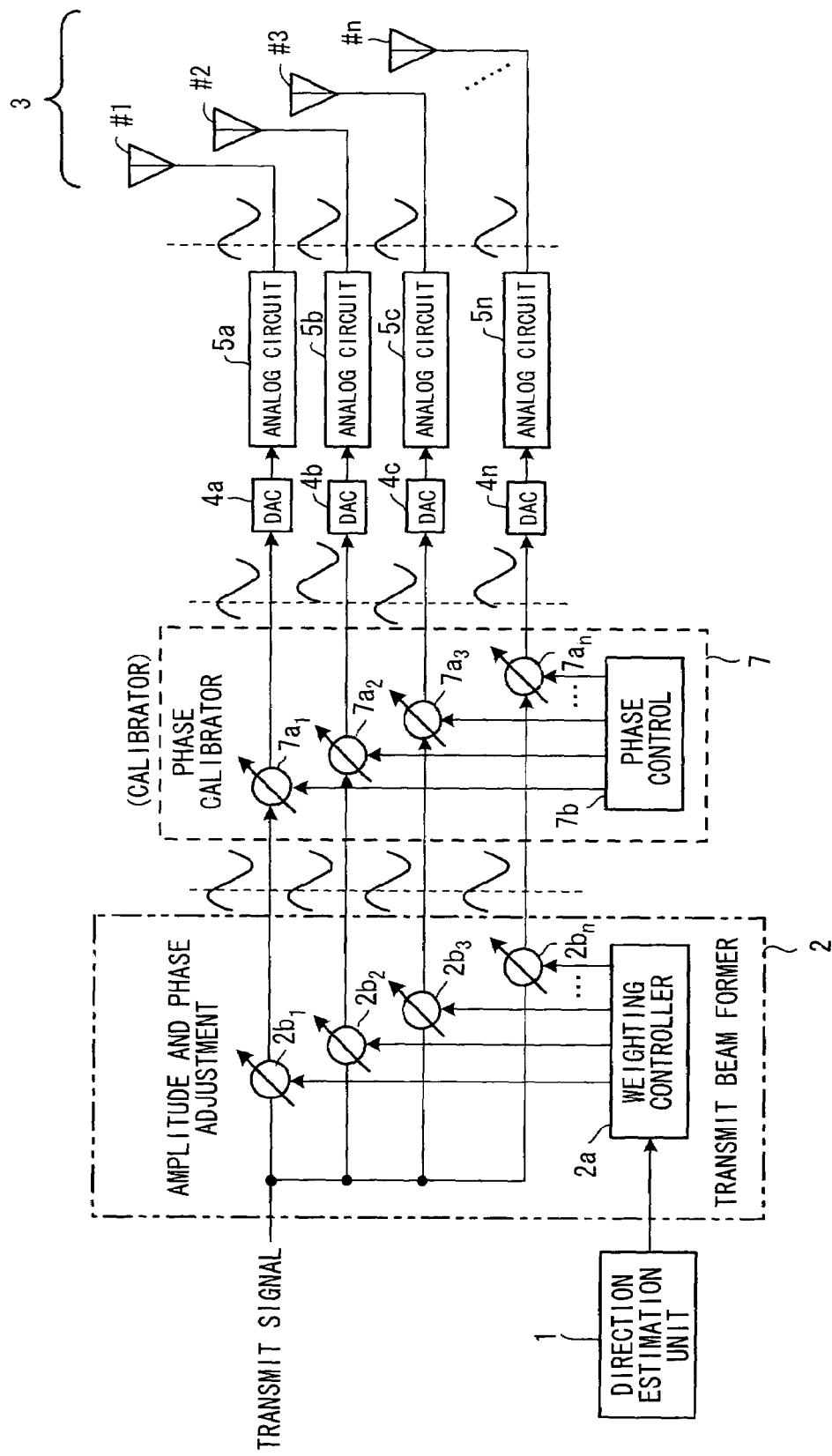
FIG. 19 is a diagram illustrating the configuration of an adaptive array antenna system having a phase calibrator according to the prior art.
Figure 20:
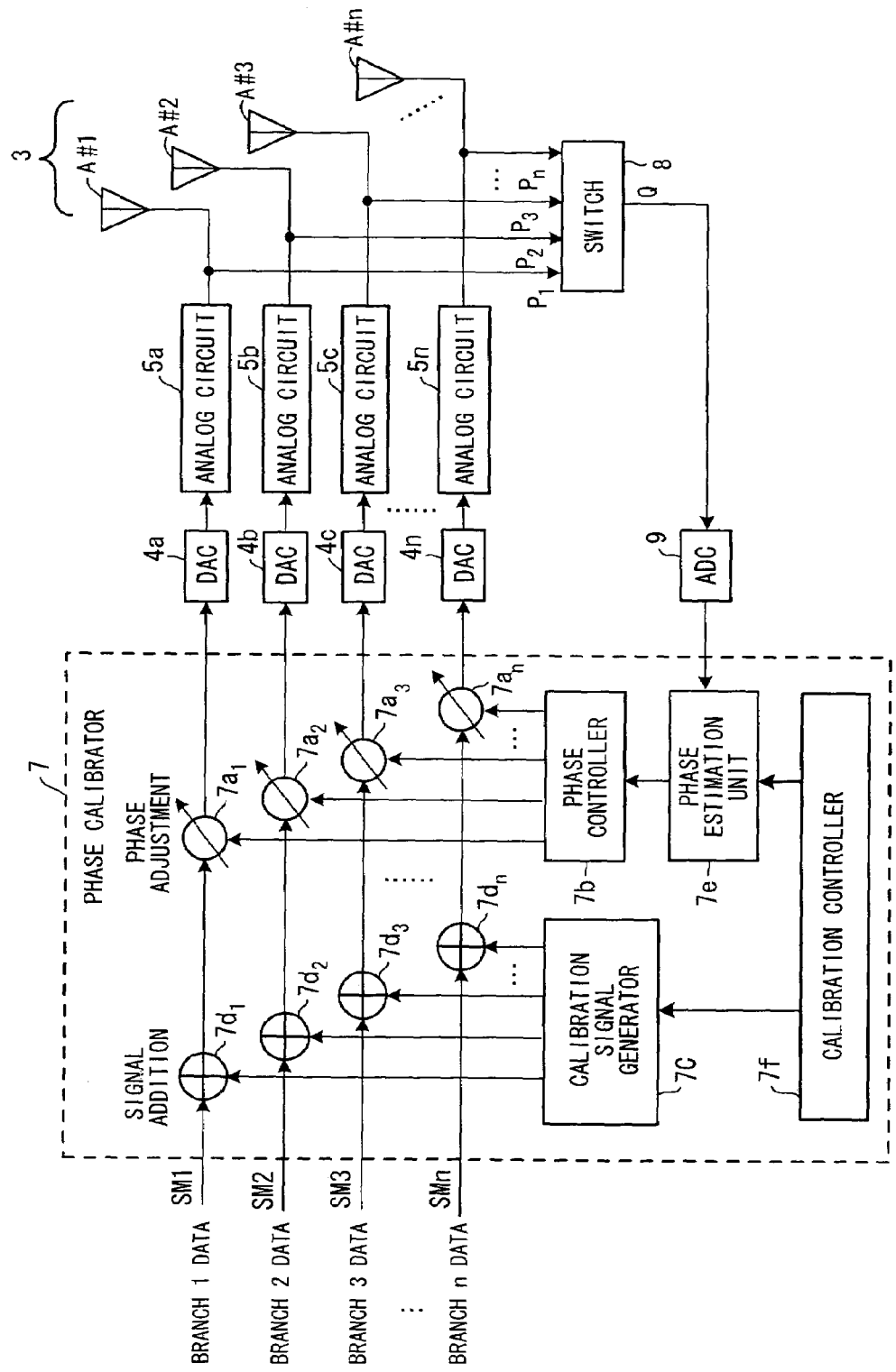
FIG. 20 is a diagram illustrating an adaptive array antenna system (based upon a switching scheme) having components for measuring the phase characteristic (phase lead/lag characteristic) of an analog circuit according to the prior art.

FIG. 16 is a second calibration control flowchart illustrating the operation of the calibration controller 53. According to second calibration control, transmission of main signals from each of the branches in not started simultaneously at system start-up.

Instead, calibration is performed by starting transmission of the signals in regular order. More specifically, phase calibration is carried out in turn one main signal at a time, and phase calibration of each of the main signals is executed sequentially by transmitting only the main signal to undergo phase calibration and main signals that have already undergone phase calibration. This embodiment eliminates the necessity of reducing the main signal or enlarging the calibration signal in the initial state as is required with first calibration control described above.

Specifically, the calibration controller 53 determines whether the system is in the initial calibration state (step 201). If the system is in the initial calibration state, then the narrow-down unit 99 is controlled to transmit the main signal only from branch 1 (step 202). The calibration signal inserting unit 51 is then controlled to insert the calibration signal SC into branch 1 and perform calibration on branch 1 (step 203). The phase characteristic of the analog circuit on branch 1 is estimated, the phase of branch 1 is adjusted so as to obtain a characteristic that is opposite this phase characteristic, and the calibration of branch 1 is completed (step 204).

Next, the narrow-down unit 99 is controlled to transmit the main signal also from branch 2 (step 205). The calibration signal inserting unit 51 is then controlled to insert the calibration signal SC into branch 2 and perform calibration on branch 2 (step 206). The phase characteristic of the analog circuit on branch 2 is estimated, the phase of branch 2 is adjusted so as to obtain a characteristic that is opposite this phase characteristic, and the calibration of branch 2 is completed (step 207).

Next, the narrow-down unit 99 is controlled to transmit the main signal also from branch 3 (step 208). The calibration signal inserting unit 51 is then controlled to insert the calibration signal SC into branch 3 and perform calibration on branch 3 (step 209). The phase characteristic of the analog circuit on branch 3 is estimated, the phase of branch 3 is adjusted so as to obtain a characteristic that is opposite this phase characteristic, and the calibration of branch 3 is completed (step 210). Thereafter, and in similar fashion, calibration of all branches is carried out. When these calibrations have been completed, calibration described above in connection with the first embodiment is carried out. Specifically, the main-signal cancellation function is implemented and the main signal is cancelled from the feedback signal (step 211). The phase characteristic of each carrier on each branch is estimated and phase control is performed (steps 212, 213). If phase control of each carrier on each branch is finished, then calibration is quit (step 214). Monitoring is then performed to determine whether a condition for starting the calibration operation again is satisfied (step 215). If the condition is satisfied, then calibration is executed by the processing of steps 211 onward.

The foregoing relates to a case where the present invention is applied to an adaptive array antenna system. However, the present invention is not limited to such a system.

Thus, in accordance with the present invention, it is possible to perform calibration of all branches in common, reduce phase deviation between branches, improve phase estimation precision and raise calibration precision.

Further, in accordance with the present invention, application to multicarrier communication is possible. That is, it is possible even in multicarrier communication to perform calibration of all branches in common, reduce phase deviation between branches, improve phase estimation precision and raise calibration precision.

Further, in accordance with the present invention, phase calibration can be performed and calibration precision raised even at the time of start-up.

As many apparently widely different embodiments of the present invention can be made without departing from the spirit and scope thereof, it is to be understood that the invention is not limited to the specific embodiments thereof except as defined in the appended claims.

What is claimed is:

1. A phase calibration method of a phased array antenna for inserting a calibration signal into a transmit signal, inputting the resultant signal to a prescribed circuit and calibrating phase of the transmit signal using the calibration signal, which is contained in an output signal from said circuit, comprising the steps of:

extracting the calibration signal by subtracting the transmit signal from the output signal of said circuit;

estimating the phase characteristic of said circuit based upon a change in phase of the calibration signal; and subjecting the transmit signal to a phase adjustment having a characteristic that is opposite the phase characteristic.

2. A phase calibration method of a phased array antenna for inserting a calibration signal into transmit signals in a plurality of branches in turn, estimating a phase characteristic of a circuit to which a respective one of the transmit signals is input and calibrating phase of each transmit signal, comprising the steps of:

outputting a first combined signal obtained by combining output signals from said circuit in all branches, and outputting a second combined signal obtained by combining the transmit signals in all branches;

extracting the calibration signal by removing the second combined signal from the first combined signal;

estimating phase characteristics of said circuits, to which the transmit signals having the inserted calibration signal are input, based upon a change in phase of the calibration signal; and subjecting the transmit signals to phase adjustment having characteristics that are opposite said phase characteristics.

3. The method according to claim 2, wherein said circuit is a high-frequency circuit that includes a modulator and a high-frequency amplifier, and extraction of the calibration signal is performed by subtracting the second combined signal, which is an analog signal, from an analog signal obtained by demodulating the first combined signal.

4. The method according to claim 2, wherein said circuit is a high-frequency circuit that includes a modulator and a high-frequency amplifier, and extraction of the calibration signal is performed by subtracting the second combined signal, which is a digital signal, from a digital signal obtained by demodulating the first combined signal and then subjecting the resultant signal to an analog-to-digital conversion.

5. The method according to claim 2, further comprising the steps of:

spreading the calibration signal by a spreading code and inserting the spread calibration signal into a prescribed transmit signal; and extracting the calibration signal by despreading a signal, which has been obtained by removing the second combined signal from the first combined signal, by the spreading code.

6. The method according to claim 2, wherein if a plurality of transmit signals per branch are transmitted by using and combining a plurality of carriers, then a calibration signal is inserted into each of the transmit signals in each of the branches in turn and the phase of each transmit signal in each branch is calibrated.

7. The method according to claim 6, further comprising the steps of:

performing modulation of a carrier-combined signal which is obtained by combing said plurality of carriers in each branch, combining the modulated signals obtained in each of the branches and demodulating the resultant combined signal to thereby produce the first combined signal; and subjecting the plurality of transmit signals in each branch to combining of carriers branch by branch, and combining the carrier-combined signals obtained in each of the branches to thereby produce the second combined signal.

8. The method according to claim 6, further comprising the steps of:
performing modulation of a carrier-combined signal which is obtained by combing said plurality of carriers in each branch, combining the modulated signals obtained in each of the branches and demodulating the resultant combined signal to thereby produce the first combined signal; and
combining said carrier-combined signal in each of the branches to generate a branch-combined signal, shifting the frequency of the calibration signal to carrier frequency of the transmit signals into which the calibration signal is inserted, and subtracting the frequency-shifted calibration signal from the branch-combined signal to thereby produce the second combined signal.

9. The method according to claim 6, further comprising the steps of:
performing modulation of a carrier-combined signal which is obtained by combing said plurality of carriers in each branch, combining the modulated signals obtained in each of the branches and demodulating the resultant combined signal to thereby produce the first combined signal;
selectively combining a transmit signal in each of the branches transmitted by a carrier having the same frequency as the carrier frequency of the transmit signals into which the calibration signal is inserted, thereby producing the second combined signal; and
extracting the calibration signal by eliminating, through use of a carrier selecting filter, signal components other than said carrier frequency contained in a signal obtained by subtracting the second combined signal from the first combined signal.

10. The method according to claim 2, further comprising the steps of:
in an initial calibration, performing phase calibration of each transmit signal upon reducing the transmit signal or enlarging the calibration signal; and
then performing said phase calibration upon restoring the transmit signal or calibration signal to its original signal level.

11. The method according to claim 2, further comprising the steps of:
in an initial calibration, performing the phase calibration in turn one transmit signal at a time anal successively transmitting a transmit signal to undergo phase calibration and a transmit signal that has already undergone phase calibration, whereby phase calibration of all transmit signals is carried out; and
then performing said phase calibration.

12. The method according to claim 2, wherein the phase calibration is controlled periodically or as necessary.

13. A phase calibration apparatus of a phased array antenna for inserting a calibration signal into transmit signals in a plurality of branches in turn, estimating a phase characteristic of a circuit to which each transmit signal is input and calibrating phase of each transmit signal, comprising:
a calibration signal inserting unit for inserting a calibration signal into transmit signals in a plurality of branches in turn;
a first combining circuit for outputting a first combined signal by combining output signals from said circuit in all branches;
a second combining circuit for outputting a second combined signal by combining the transmit signals in all branches;
a calibration signal extracting unit for extracting the calibration signal by removing the second combined signal from the first combined signal; and
a phase adjusting unit for estimating phase characteristics of said circuits, to which the transmit signals having the inserted calibration signal are input, based upon a change in phase of the calibration signal, and subjecting the transmit signals to phase adjustment having characteristics that are opposite said phase characteristics.

14. The apparatus according to claim 13, wherein said circuit is a high-frequency circuit that includes a modulator and a high-frequency amplifier; and
said calibration signal extracting unit includes:
a subtractor for subtracting the second combined signal, which is an analog signal, from a signal obtained by demodulating the first combined signal; and
an A/D converter for converting an output signal from said subtractor to a digital signal.

15. The apparatus according to claim 13, wherein said circuit is a high-frequency circuit that includes a modulator and a high-frequency amplifier, and
said calibration signal extracting unit includes:
an A/D converter for converting a signal, which has been obtained by demodulating the first combined signal, to a digital signal; and
a subtractor for subtracting the second combined signal, which is a digital signal, from the digital demodulated signal.

16. The apparatus according to claim 13, further comprising:
a spreader for spreading the calibration signal by a spreading code;
an inserting unit for inserting the spread signal into a prescribed transmit signal; and
a despreader for despreading a signal, which has been obtained by removing the second combined signal from the first combined signal, by the spreading code, and extracting the calibration signal.

17. The apparatus according to claim 13, wherein if a plurality of transmit signals per branch are transmitted by using and combining a plurality of carriers, then said calibration signal inserting unit inserts a calibration signal into each of the transmit signals in each of the branches in turn and calibrates the phase of each transmit signal in each branch.

18. The apparatus according to claim 17, wherein said first combining circuit includes:
a combiner for combining modulated signal obtained in each branch by performing modulation of a carrier-combined signal which is obtained by combing said plurality of carriers in each branch; and
a demodulator for demodulating the resultant combined signal to thereby produce the first combined signal; and
said second combining circuit includes:
a carrier combiner for subjecting the plurality of transmit signals in each branch to combining of carriers branch by branch; and
a combiner for combining the carrier-combined signals obtained in each of the branches to thereby produce the second combined signal.

19. The apparatus according to claim 17, wherein said first combining circuit includes:
- a combiner for combining modulated signal obtained in each branch by performing modulation of a carrier-combined signal which is obtained by combing said plurality of carriers in each branch; and
- a demodulator for demodulating the resultant combined signal to thereby produce the first combined signal; and said second combining circuit includes:
- a combiner for combining said carrier-combined signals in each of the branches to generate a branch-combined signal;
- a frequency shifter for shifting the frequency of the calibration signal to carrier frequency of the transmit signals into which the calibration signal is inserted; and
- a subtractor for subtracting the frequency-shifted calibration signal from the branch-combined signal to thereby produce the second combined signal.

20. The apparatus according to claim 17, wherein said first combining circuit includes:
- a combiner for combining modulated signal obtained in each branch by performing modulation of a carrier-combined signal which is obtained by combing said plurality of carriers in each branch; and
- a demodulator for demodulating the resultant combined signal to thereby output the first combined signal; and said second combining circuit includes:
- a selector for selecting a transmit signal in each of the branches transmitted by a carrier having the same frequency as the carrier frequency of the transmit signals into which the calibration signal is inserted; and
- a combiner for combining the selected transmit signals, thereby outputting the second combined signal; and said calibration signal extracting unit includes a carrier selecting filter for eliminating signal components other than said carrier frequency contained in a signal obtained by subtracting the second combined signal from the first combined signal.

21. The apparatus according to claim 13, further comprising a controller which, in an initial calibration, is for exercising control so as to perform phase calibration of each transmit signal upon reducing the transmit signal or enlarging the calibration signal, and then perform the phase calibration upon restoring the transmit signal or calibration signal to its original signal level.

22. The apparatus according to claim 13, further comprising a controller which, in an initial calibration, is for exercising control so as to perform the phase calibration in turn one transmit signal at a time and successive transmit a transmit signal to undergo phase calibration and a transmit signal that has already undergone phase calibration, whereby phase calibration of all transmit signals is carried out.

23. The apparatus according to claim 13, further comprising a controller for exercising control so as to control the phase calibration periodically or as necessary.

* * * * *